US011938063B2

(12) United States Patent
Trimble et al.

(10) Patent No.: US 11,938,063 B2
(45) Date of Patent: Mar. 26, 2024

(54) PATIENT SUPPORT APPARATUS DEPLOYMENT MECHANISMS

(71) Applicant: Stryker Corporation, Kalamazoo, MI (US)

(72) Inventors: Shawn Trimble, Portage, MI (US); Christopher Gentile, Sturgis, MI (US); Ross T. Lucas, Paw Paw, MI (US); Kaitlin Konopacz, Lake Zurich, IL (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 17/692,308

(22) Filed: Mar. 11, 2022

(65) Prior Publication Data

US 2022/0192903 A1 Jun. 23, 2022

Related U.S. Application Data

(63) Continuation of application No. 16/705,878, filed on Dec. 6, 2019, now Pat. No. 11,298,279.

(60) Provisional application No. 62/776,821, filed on Dec. 7, 2018, provisional application No. 62/776,817, filed on Dec. 7, 2018, provisional application No. 62/776,832, filed on Dec. 7, 2018.

(51) Int. Cl.
*A61G 1/02* (2006.01)
*A61G 1/017* (2006.01)

(52) U.S. Cl.
CPC ........... *A61G 1/017* (2013.01); *A61G 1/0281* (2013.01)

(58) Field of Classification Search
CPC . A61G 1/00; A61G 1/02; A61G 1/017; A61G 1/0281; A61G 1/0275; A61G 2200/32; A61G 2200/34
See application file for complete search history.

(56) References Cited

U.S. PATENT DOCUMENTS 2,682,913 A * 7/1954 Manternach ........... A61G 5/006 5/619
6,381,781 B1 5/2002 Bourgraf et al.
6,565,112 B2 * 5/2003 Hanson ................ A61G 7/0528 297/341
6,742,206 B1 * 6/2004 Han ....................... A61G 7/165 5/85.1

(Continued)

*Primary Examiner* — Fredrick C Conley

(74) *Attorney, Agent, or Firm* — Howard & Howard Attorneys PLLC

(57) ABSTRACT

A patient support apparatus includes a litter that includes a support structure articulable between seated and supine configurations. The support structure includes a seat section and a leg section coupled to the seat section and articulable relative to the seat section around a seat axis between first and second angular positions corresponding to the seated and supine configurations, respectively. The apparatus includes a steerable wheel assembly coupled to and rotatable relative to the leg section around a steering axis, and a wheel system including a deployment frame coupled to and rotatable relative to the leg section around a pivot axis and a wheel coupled to and rotatable relative to the deployment frame around a wheel axis parallel to the seat axis. The apparatus includes a wheel deployment mechanism configured to rotate the deployment frame around the pivot axis when the leg section articulates between the first and second angular positions.

19 Claims, 23 Drawing Sheets

(56) References Cited

U.S. PATENT DOCUMENTS

| | | | | |
|---|---|---|---|---|
| 7,398,571 | B2 | 7/2008 | Souke et al. | |
| 9,486,373 | B2 | 11/2016 | Lambarth et al. | |
| 9,510,981 | B2 | 12/2016 | Lambarth et al. | |
| 2009/0230638 | A1 * | 9/2009 | Reed | A61G 5/0891 297/344.22 |
| 2018/0028377 | A1 * | 2/2018 | Stryker | A61G 1/017 |
| 2018/0028383 | A1 * | 2/2018 | Stryker | A61G 7/1046 |
| 2018/0177652 | A1 | 6/2018 | Furman et al. | |
| 2018/0185212 | A1 | 7/2018 | Lucas et al. | |
| 2018/0185213 | A1 | 7/2018 | Naber et al. | |
| 2020/0179191 | A1 | 6/2020 | Trimble et al. | |

* cited by examiner

PATIENT SUPPORT APPARATUS DEPLOYMENT MECHANISMS

CROSS-REFERENCE TO RELATED APPLICATIONS

The subject patent application is a Continuation of U.S. patent application Ser. No. 16/705,878, filed on Dec. 6, 2019, which claims priority to and all the benefits of: U.S. Provisional Patent Application No. 62/776,817, filed on Dec. 7, 2018; U.S. Provisional Patent Application No. 62/776,821, filed on Dec. 7, 2018; and U.S. Provisional Patent Application No. 62/776,832, filed on Dec. 7, 2018; the disclosures of each of which are hereby incorporated by reference in their entirety.

BACKGROUND

Patient support apparatuses facilitate care of patients in a health care setting and are typically realized, for example, as hospital beds, stretchers, cots, tables, wheelchairs, and chairs. A conventional patient support apparatus comprises a base and a litter upon which the patient is supported.

Certain types of litters of patient support apparatuses are capable of being articulated between a supine configuration (in which the litter performs as a cot) and a seated configuration (in which the litter performs as a moveable chair). The litter includes a plurality of sections that support the patient and rotate relative to one another to articulate the litter between the supine and seated configurations.

The articulation of the litter between the seated and supine configurations causes a leg section (disposed below the legs of the patient) rotate between a horizontal orientation in the supine configuration and a vertical orientation in the seated configuration. As a result, the leg section must move along the floor surface. Often, the leg section includes caster wheels that allow the litter to turn in the seated configuration (similar to a wheelchair). The caster wheels may be used to facilitate movement of the leg section along the floor surface. However, the wheel axis of the caster wheels must be parallel to the axis of articulation of the leg section in order for the caster wheels to roll along the floor surface. If the wheel axis is not parallel to the axis of articulation, the caster wheels will simply skid across the ground, making it difficult to articulate the litter between the supine and seated configurations. Some litters use a lock to maintain the parallel orientation of the wheel axis and the axis of articulation. However, the caster wheels must be manually positioned into the parallel orientation and the lock must be manually actuated in order to articulate the litter between the supine and seated configurations. Likewise, the lock must be manually disconnected when the operator wishes to turn the litter in the seated configuration after the litter articulates from the supine configuration to the seated configuration. While effective, the lock requires the operator (typically emergency responders) to perform more tasks in situations when time is of the essence.

Furthermore, the joint between the sections of the litter that support the legs of the patient is offset from the joint defined by the knees of the patient, which results in length disparities between the litter and the patient as the leg is rotated. Some litters use a foot section that extended from the foot end of the litter to extend the overall length of the litter in the supine configuration. Often the foot section must be manually extended, which requires emergency responders to perform more tasks in situations when time is of the essence. Motorized litters may automatically articulate the sections of the litter and extend the foot section without user effort; however, multiple motors are required to separately perform the articulation and the extension, which increases the weight of the litter. Increasing the weight of the litter makes the litter difficult to transport into emergency locations and increases the potential for injuring the emergency responder.

A patient support apparatus that overcomes one or more of the aforementioned challenges is desired.

DETAILED DESCRIPTION OF THE EMBODIMENTS

Figure 1:
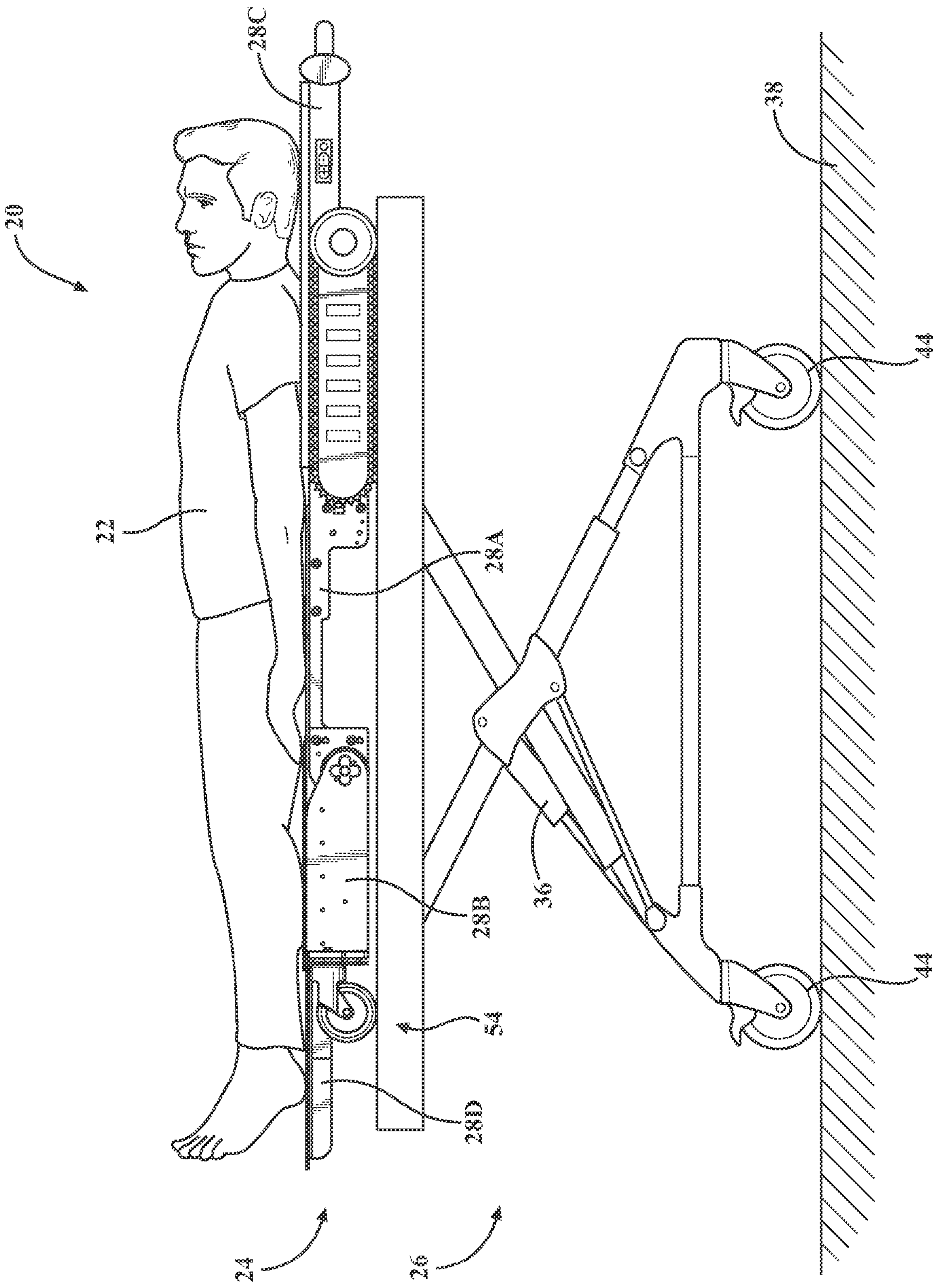
FIG. 1 is a perspective view of a patient support apparatus shown comprising a base and a litter, with the base supporting the litter in a lifted base position.
Figure 2:
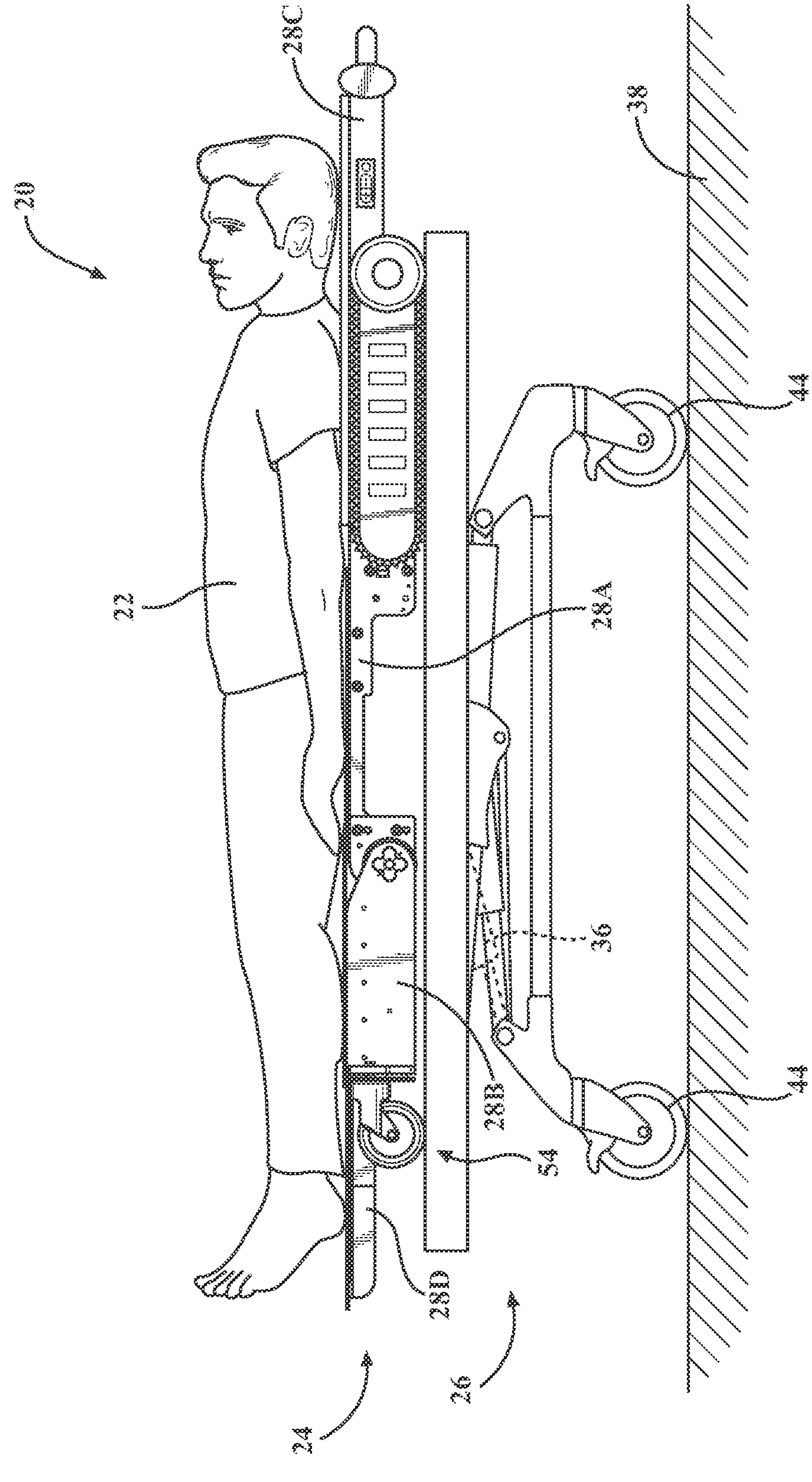
FIG. 2 is a side elevational view of the patient support apparatus of FIG. 1, with the base supporting the litter in a lowered base position.

Referring to FIGS. 1 and 2, a patient support apparatus is shown at 20 for supporting a patient 22 in a health care setting. As will be appreciated from the subsequent description below, while the illustrated embodiments of the patient support apparatus 20 described herein are configured as cots for transporting patients 22, the patient support apparatus 20 may comprise a hospital bed, a stretcher, a table, a wheelchair, a chair, or a similar apparatus utilized in the care of the patient 22. The embodiment of the patient support apparatus 20 shown in FIGS. 1 and 2 generally comprises a litter 24 and a base 26, each of which are described in greater detail below.

In some embodiments, the patient support apparatus 20 may comprise a reconfigurable patient support as described in U.S. Pat. No. 9,486,373, which is hereby incorporated by reference in its entirety. In some embodiments, the patient support apparatus 20 may comprise a reconfigurable transport apparatus as described in U.S. Pat. No. 9,510,981, which is hereby incorporated by reference in its entirety. In some embodiments, the patient support apparatus 20 may comprise a person support apparatus system as described in U.S. Patent Application Publication No. 2018/0028383, which is hereby incorporated by reference in its entirety. In some embodiments, the patient support apparatus 20 may comprise a patient transfer apparatus with integrated tracks as described in U.S. Patent Application Publication No. 2018/0185212, which is hereby incorporated by reference in its entirety. In some embodiments, the patient support apparatus 20 may comprise a variable speed patient transfer apparatus as described in U.S. Patent Application Publication No. 2018/0177652, which is hereby incorporated by reference in its entirety. In some embodiments, the patient support apparatus 20 may comprise a patient transfer apparatus as described in U.S. Patent Application Publication No. 2018/0185213, which is hereby incorporated by reference in its entirety. In some embodiments, the patient support apparatus 20 may comprise an ambulance cot as described in U.S. Pat. No. 7,398,571, which is hereby incorporated by reference in its entirety. In some embodiments, the patient support apparatus 20 may comprise an adaptive user interface as described in U.S. Pat. No. 7,398,571, which is hereby incorporated by reference in its entirety.

As noted above, the patient support apparatus 20 may further comprise the base 26 selectively coupled to and configured to support the litter 24. As shown in FIGS. 1 and 2, the base 26 comprises a base lift device 36 configured to raise and lower the patient support surface relative to a floor surface 38 when the litter 24 is coupled to the base 26. More specifically, the base lift device 36 is configured to move the litter 24 relative to the floor surface 38 between a lifted base position (see FIG. 1) and a lowered base position (see FIG. 2), and to a plurality of intermediate positions therebetween.

The base lift device 36 is coupled to the base 26 and is configured to raise and lower the litter 24 between the lifted and lowered base positions of the base 26, and intermediate positions therebetween, when the base 26 supports the litter 24. The base lift device 36 may be configured to operate in the same manner or a similar manner as the base lift devices shown in U.S. Pat. Nos. 7,398,571, 9,486,373, 9,510,981, and/or U.S. Patent Application Publication No. 2018/0028383, previously referenced. The base lift device 36 may be powered (hydraulic, electric, etc.) or may be manually operated.

The base 26 is configured for movement along the floor surface 38 (e.g., the ground). More specifically, the base 26 may comprise wheels 44 to facilitate transport over the floor surface 38. The wheels 44 are arranged in each of four quadrants of the base 26. In the illustrated embodiments, the wheels 44 are caster wheels, which are able to rotate and swivel during transport. In addition, in some configurations, the wheels 44 are not caster wheels and may be non-steerable, steerable, non-powered, powered, or combinations thereof. Additional wheels are also contemplated. For example, the patient support apparatus 20 may comprise four non-powered, non-steerable wheels, along with one or more powered wheels. In some cases, the patient support apparatus 20 may not include any wheels. In other configurations, one or more auxiliary wheels (powered or non-powered), which are movable between stowed positions and deployed positions, may be coupled to the base 26. In some cases, when these auxiliary wheels contact the floor surface 38 in the deployed position, they cause two of the wheels 44 to be lifted off the floor surface 38 thereby shortening a wheelbase of the patient support apparatus 20. A fifth wheel may also be arranged substantially in a center of the base 26. Other configurations are contemplated.

The litter 24 may be selectively separable from the base 26. Said differently, the base 26 may be configured to removably receive and support the litter 24 in certain situations. In the illustrated embodiment, the litter 24 is configured for releasable attachment to the base 26. As will be appreciated from the subsequent description below, the litter 24 may be considered to be a patient support apparatus 20 both when it is attached to the base 26 (see FIGS. 1 and 2) and when it has been removed from the base 26 (see FIGS. 3-8 and 16-19).

Figure 7:
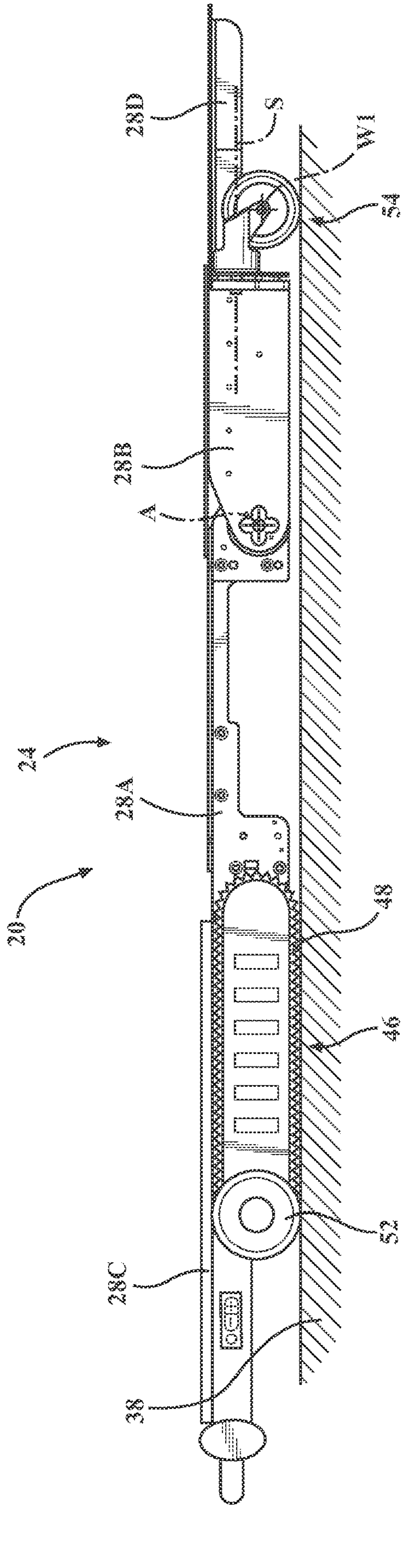
FIG. 7 is a side elevational view of the patient support apparatus of FIG. 3, shown with the support structure of the litter in a supine configuration and with the leg section in a second angular position and a foot section in a second position.
Figure 8:
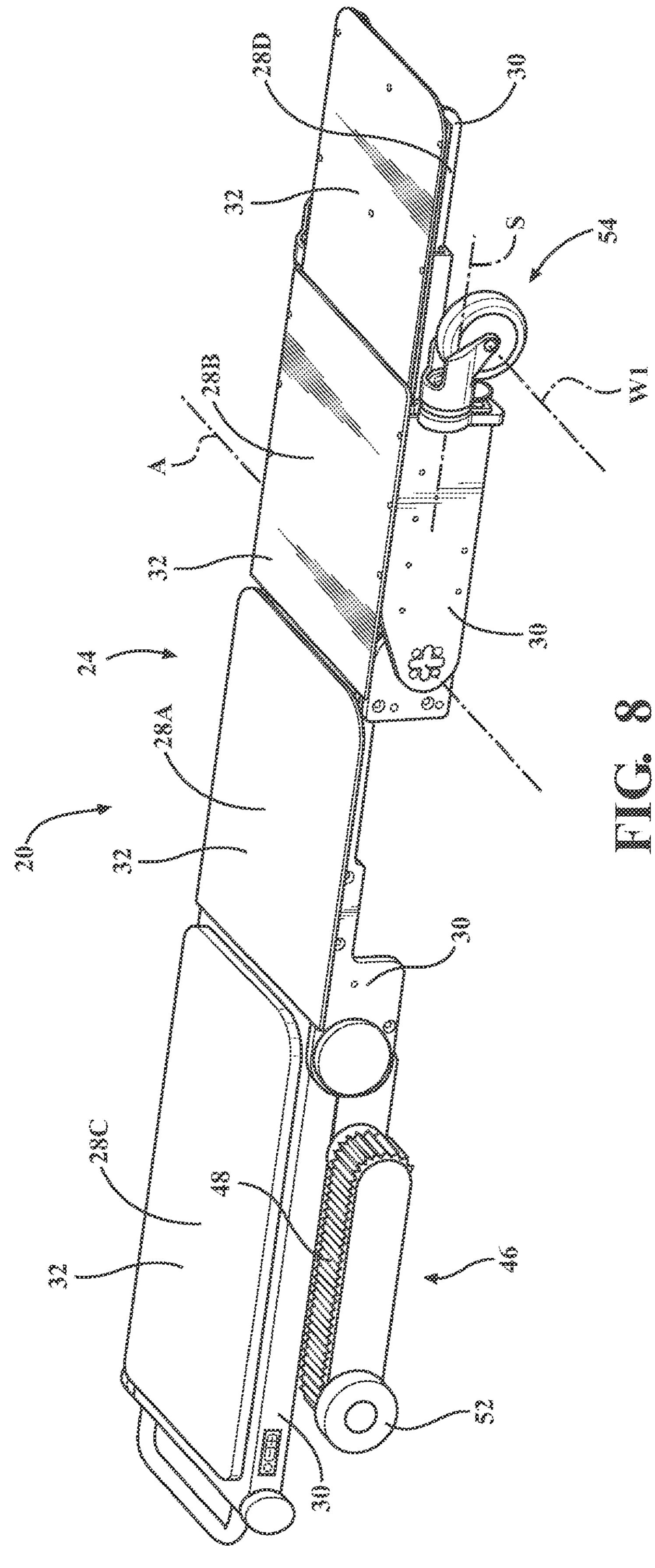
FIG. 8 is a perspective view of the patient support apparatus of FIG. 3, shown with the support structure of the litter in the seated configuration.
Figure 19:
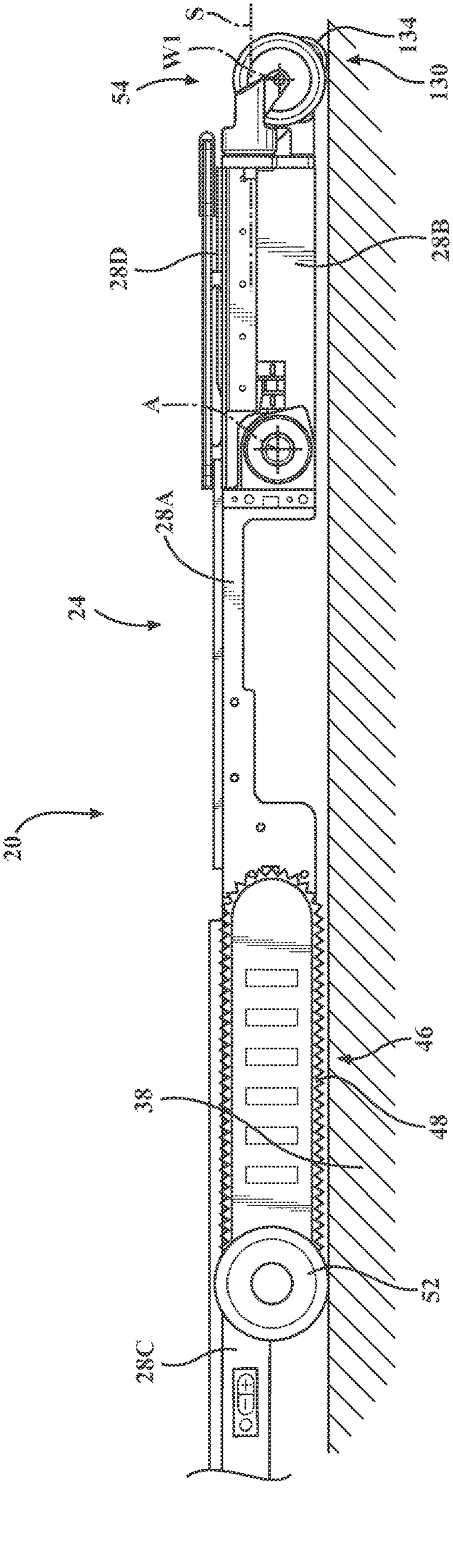
FIG. 19 is a side elevational view of the patient support apparatus of FIG. 16, shown with the support structure of the litter in the supine configuration and with the leg section in the second angular position and the wheel system engaged with the floor surface.

The litter 24 comprises a support structure 28 articulable between a seated configuration (see FIGS. 3, 4, 16, and 17) and a supine configuration (see FIGS. 7, 8, and 19). The support structure 28 is configured to support the patient 22 in each of the seated and supine configurations. More specifically, the support structure 28 may comprise a seat section 28A and a leg section 28B coupled to the seat section 28A and articulable relative to the seat section 28A between a first angular position in the seated configuration and a second angular position, different from the first angular position, in the supine configuration. The leg section 28B may be articulable relative to the seat section 28A around a seat axis A. The support structure 28 may further comprise a fowler section 28C coupled to the seat section 28A and articulable relative to the seat section 28A, with the fowler section 28C and the leg section 28B coupled to opposing sides of the seat section 28A. The fowler section 28C and the leg section 28B may articulate relative to the seat section 28A in any manner. For example, the fowler section 28C and the leg section 28B may simultaneously articulate relative to the seat section 28A or may independently articulate relative to the seat section 28A. The articulation of the support structure 28 may configure the litter 24 to serve as a mobile chair to transport patients 22 up and down stairs. Mobile chairs (sometimes called "stair chairs") are generally used to evacuate patients 22 from buildings where patient accessibility is limited, such as buildings having more than one floor.

In the first angular position, the leg section 28B may be substantially orthogonal to the seat section 28A, as shown in FIGS. 3, 4, 16, and 17. The leg section 28B and the seat section 28A may be substantially coplanar when disposed in the second angular position, as shown in FIGS. 7, 8, and 19. However, the first and second angular positions may correspond to any suitable angle between the seat and leg sections 28A, 28B to correspond to the seated and supine configurations, respectively.

As shown in FIG. 8, each of the sections of the support structure 28 may comprise a frame 30 and a deck 32 mounted to and supported by the frame 30. However, each of the sections of the support structure 28 could be comprised of a single, integral component without escaping the scope of the subject disclosure.

As shown in FIGS. 3, 9, 16, and 23, the patient support apparatus 20 may further comprise a litter actuation mechanism 34 coupled to the litter 24, separate from the base lift device 36, and configured to move the support structure 28 between the seated and supine configurations when the litter 24 is separated from the base 26. More specifically, the litter actuation mechanism 34 may be configured to raise and lower the patient 22 between the seated and supine configurations, and intermediate positions therebetween when the litter 24 is separated from the base 26. To this end, the litter actuation mechanism 34 may comprise an electrical device 40 (e.g. a motor) operably coupled to the leg section 28B and configured to articulate the leg section 28B between the first and second angular positions. Moreover, the litter actuation mechanism 34 may comprise a plurality of electrical devices 40 coupled to a controller and cooperatively configured to move the support structure 28 between the seated and supine configurations. The litter actuation mechanism 34 may be powered in any other suitable manner (hydraulic, electric, etc.) or may be manually operated.

The patient support apparatus 20 may further comprise a transportation mechanism 46 coupled to the litter 24 for facilitating movement of the litter 24 along the floor surface 38, as shown in FIGS. 3-8 and 16-19. The transportation mechanism 46 may comprise a continuous track 48 and a track driving device propelling the continuous track 48 to assist users in traversing a flight of stairs or rough/uneven surfaces that may not be easily traversed by the base 26 by mitigating the load users (e.g., caregivers) would otherwise be required to lift. In some configurations, the track driving device may be configured to move the litter 24 across the floor surface 38 while the patient 22 is supported in the seated and/or supine configurations. The track driving device may further comprise wheels 52 configured to be disposed in contact with the floor surface 38. In the illustrated embodiments, the wheels 52 are freely rotatable. In alternative embodiments, the wheels 52 may be powered drive wheels that may be driven. The track driving device may be configured to operate in the same manner or a similar manner as those shown in U.S. Pat. Nos. 9,486,373, 9,510,981, U.S. Patent Application Publication No. 2018/0185212, and/or U.S. Patent Application Publication No. 2018/0177652, previously referenced.

Figure 3:
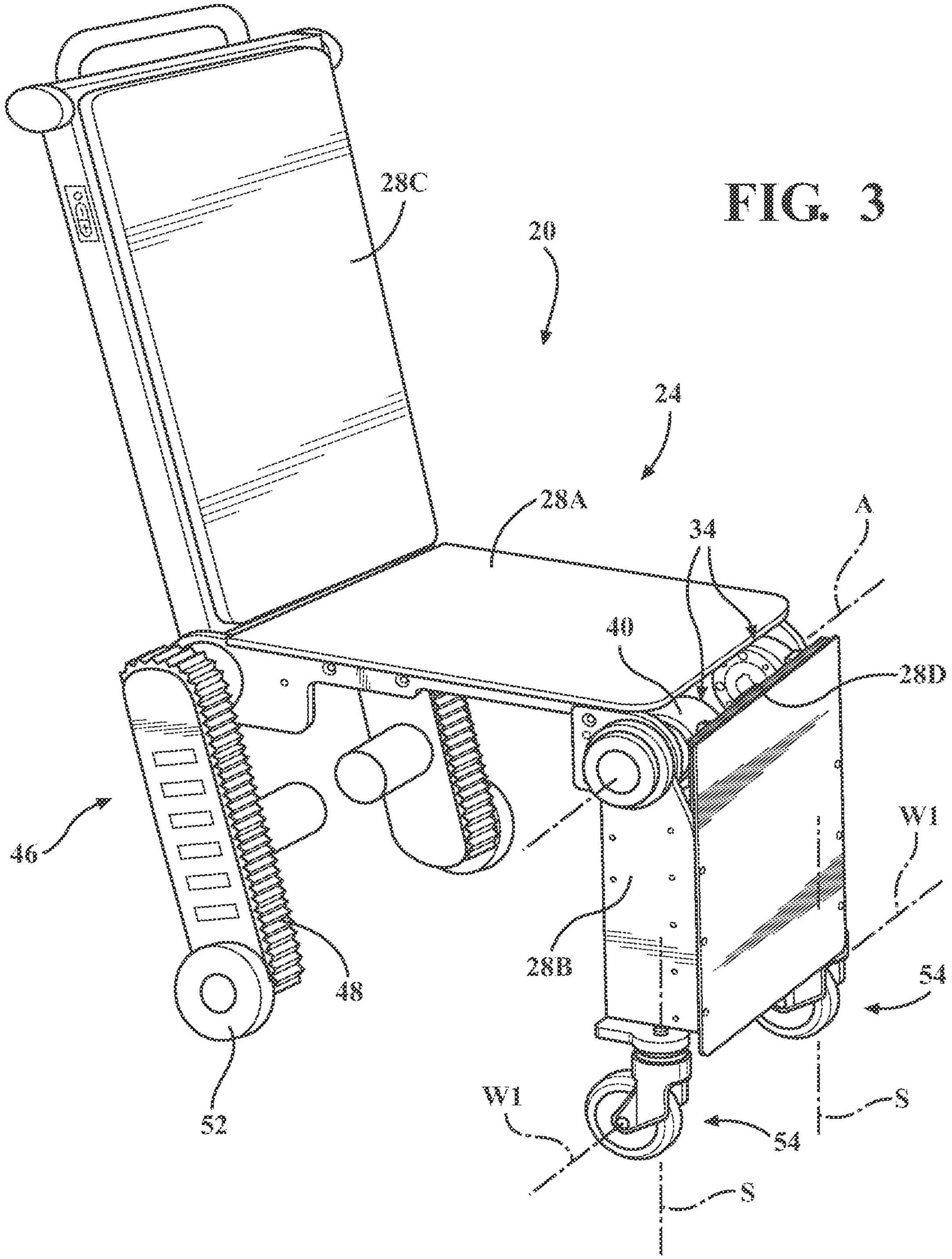
FIG. 3 is a perspective view of a patient support apparatus comprising a litter, with a support structure of the litter in a seated configuration.
Figure 4:
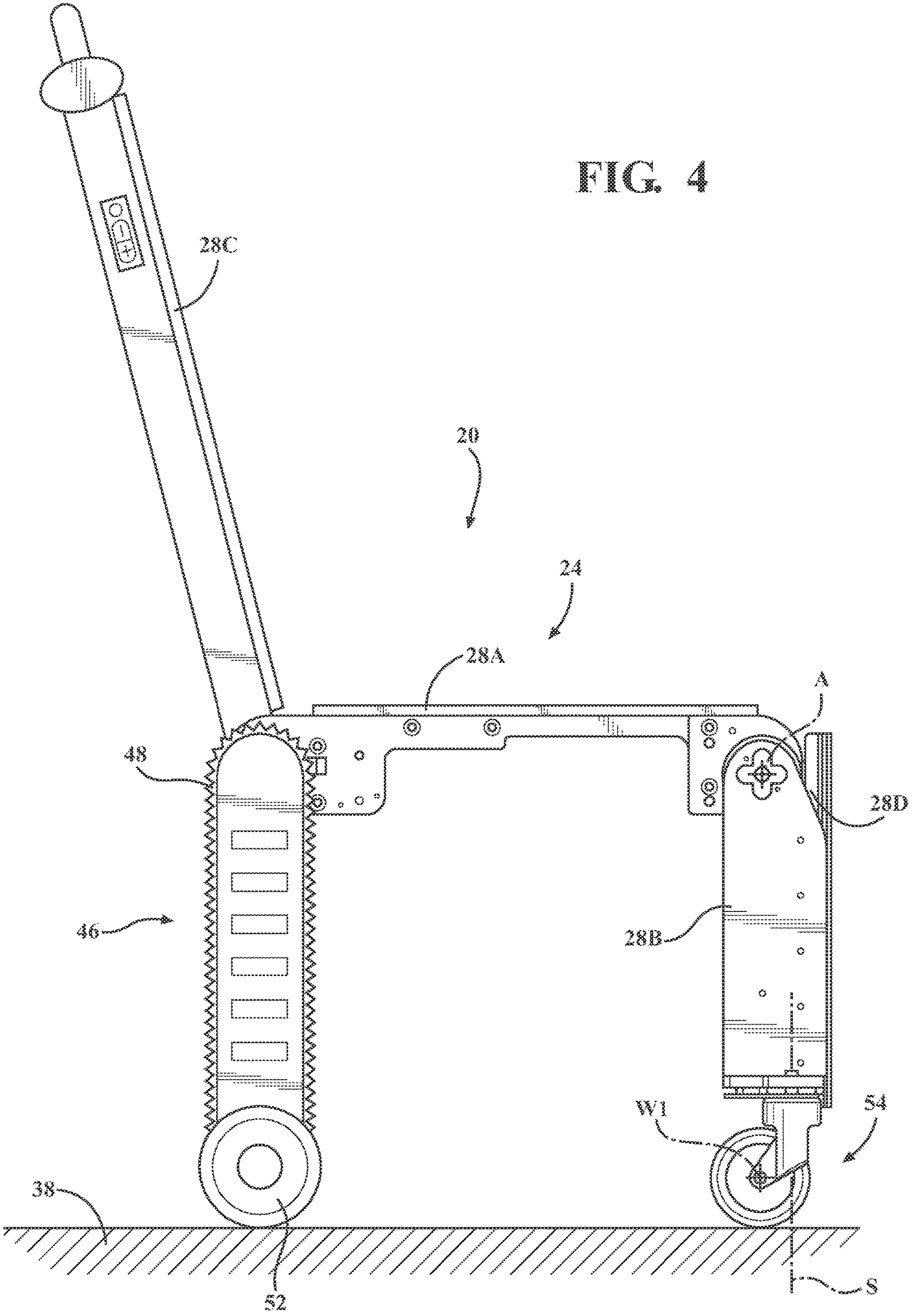
FIG. 4 is a side elevational view of the patient support apparatus of FIG. 3, shown with the support structure of the litter in the seated configuration and with a leg section in a first angular position and a foot section in a first position.
Figure 5:
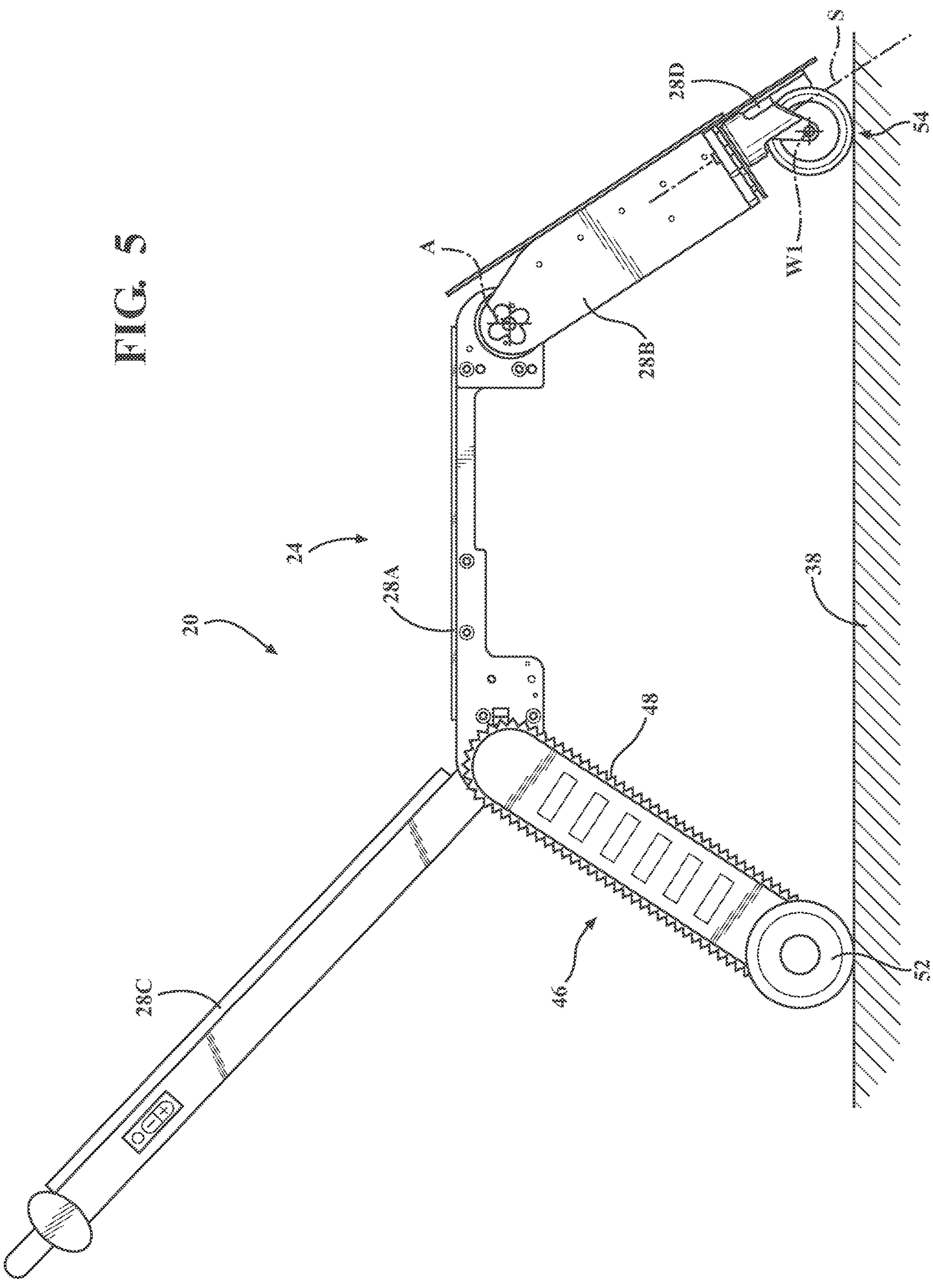
FIG. 5 is a side elevational view of the patient support apparatus of FIG. 3, shown with the leg section articulated away from the first angular position and the foot section translated away from the first position.
Figure 6:
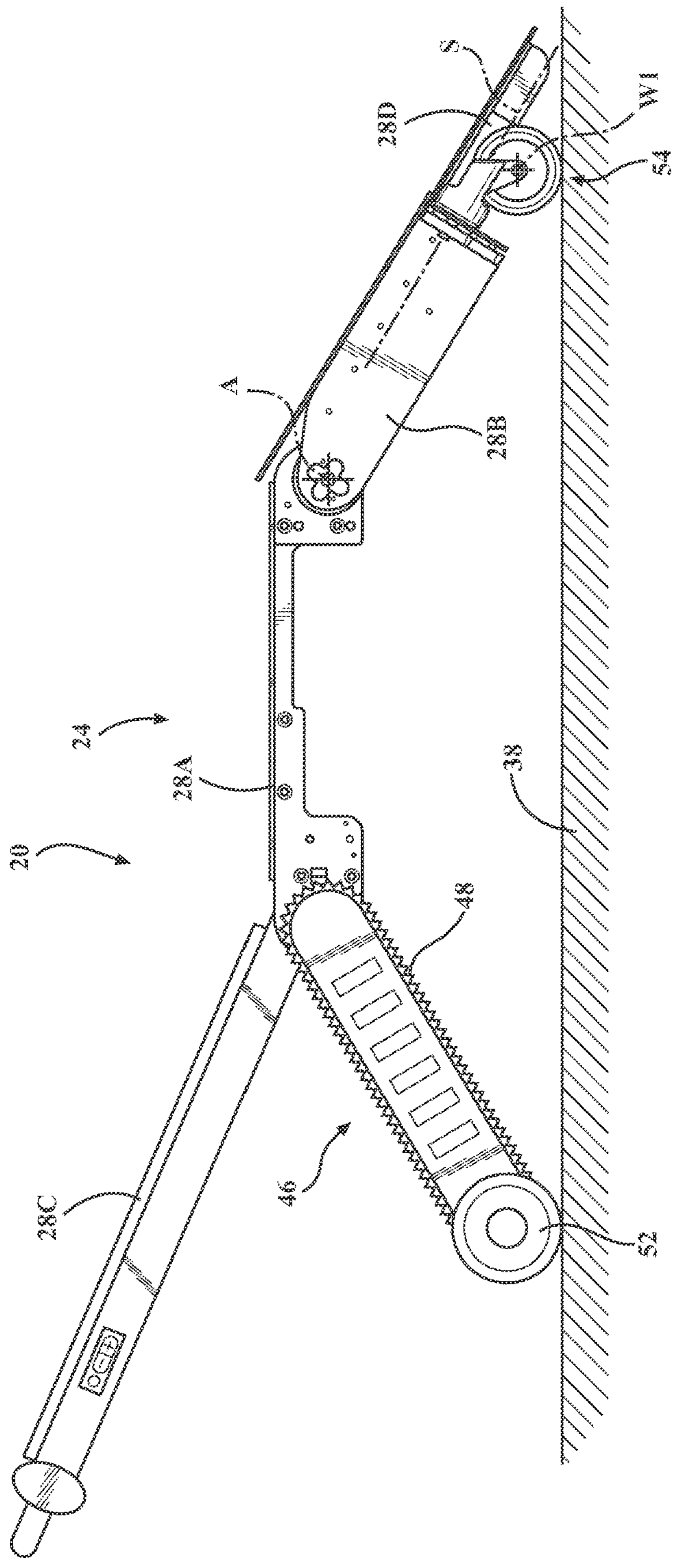
FIG. 6 is a side elevational view of the patient support apparatus of FIG. 3, shown with the leg section further articulated away from the first angular position and the foot section further translated away from the first position.
Figure 15:
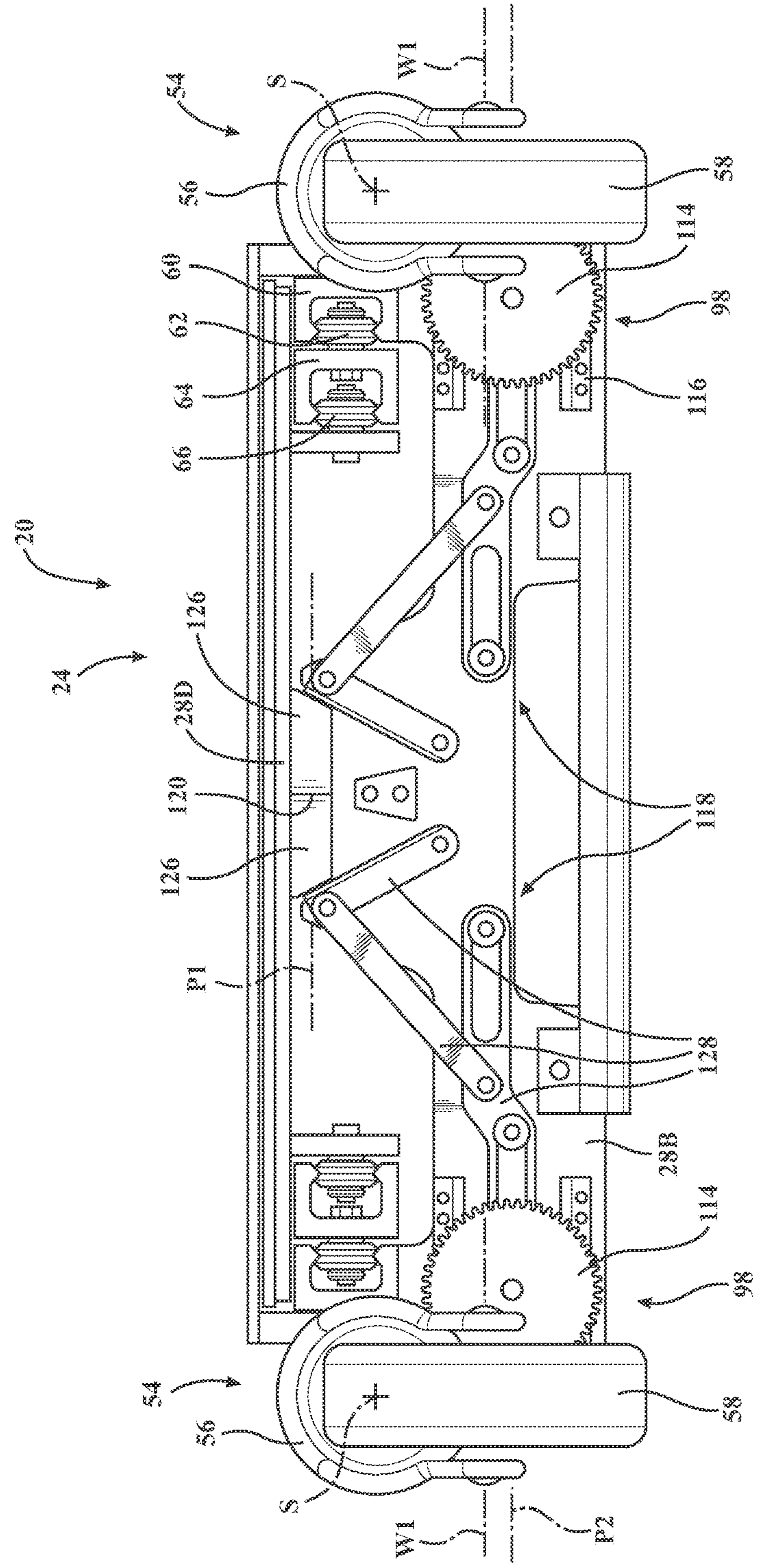
FIG. 15 is a bottom elevational view of the patient support apparatus of FIG. 3, showing the mangle gear rack of the wheel orientation mechanism in the first linear position and the caster frame in the other one of the pair of transition positions.
Figure 16:
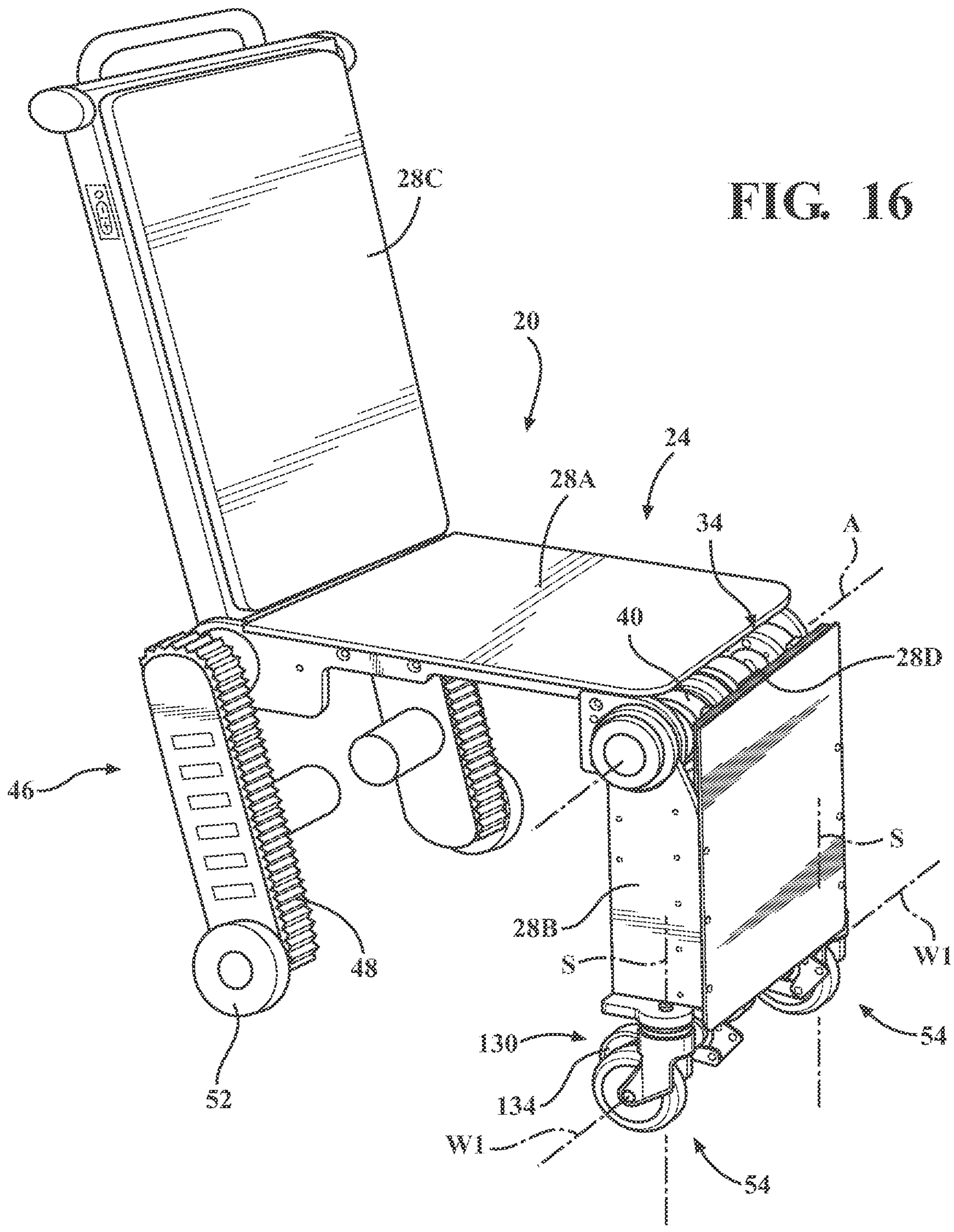
FIG. 16 is a perspective view of another embodiment of the patient support apparatus comprising the litter, with the support structure of the litter in the seated configuration.
Figure 17:
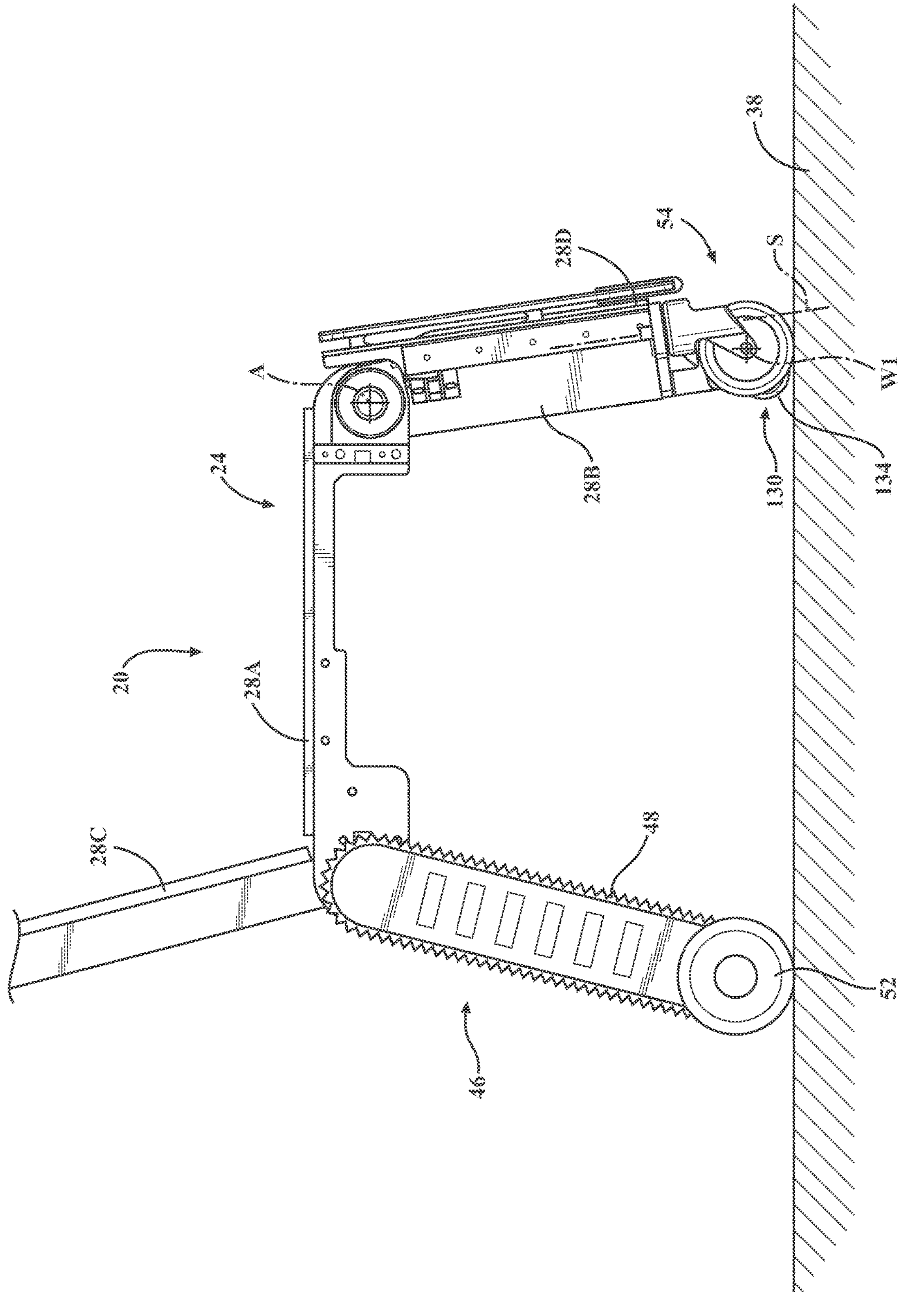
FIG. 17 is a side elevational view of the patient support apparatus of FIG. 16, shown with the support structure of the litter in the seated configuration and with the leg section in the first angular position and a wheel system spaced from a floor surface.
Figure 18:
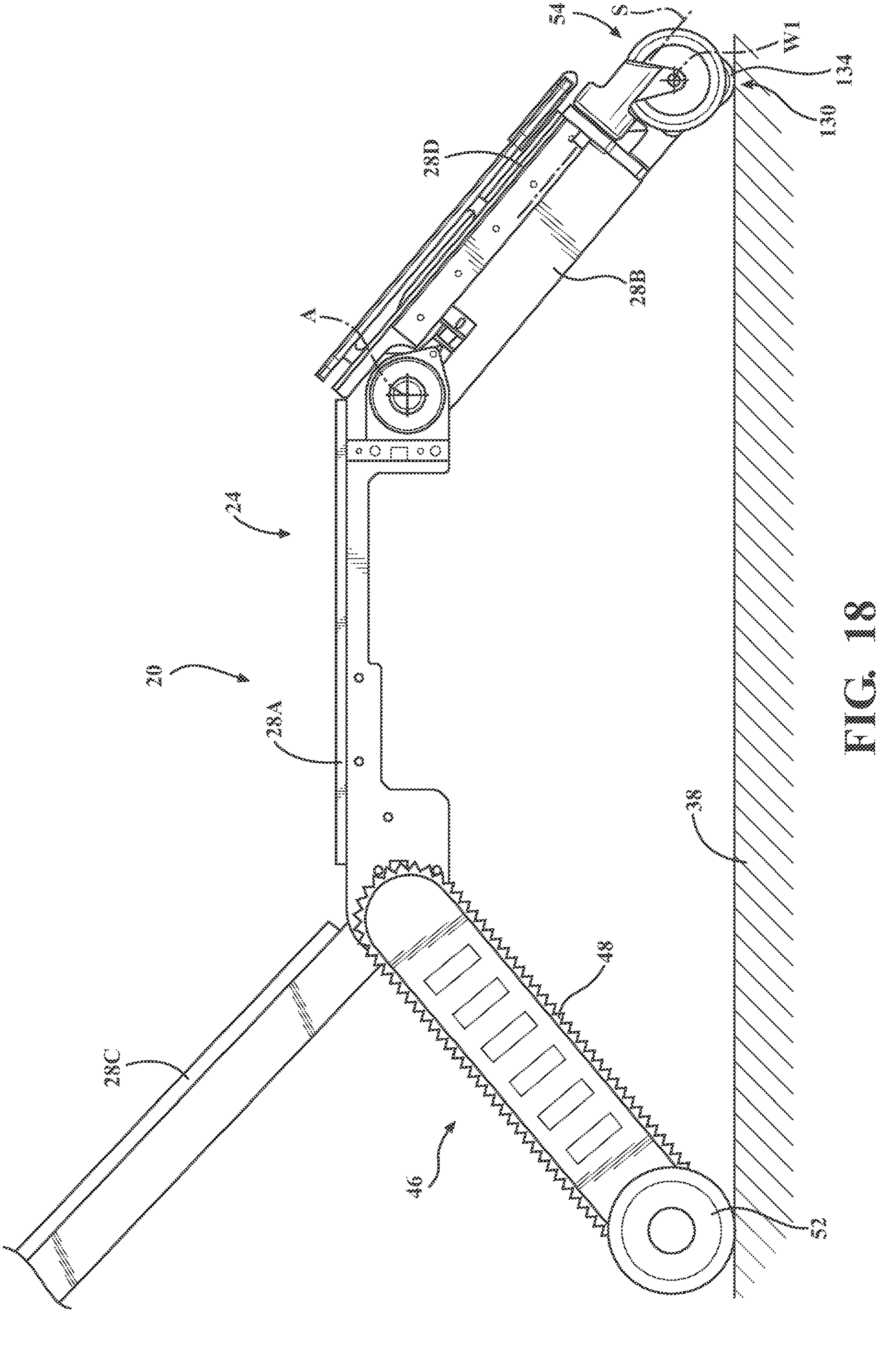
FIG. 18 is a side elevational view of the patient support apparatus of FIG. 16, shown with the leg section articulated away from the first angular position and the wheel system engaged with the floor surface

As shown in FIGS. 3 and 16, the patient support apparatus 20 may further comprise a steerable wheel assembly 54 coupled to the leg section 28B. The steerable wheel assembly 54 may engage the floor surface 38 in each of the seated and supine configurations. As shown in FIGS. 9-15, the steerable wheel assembly 54 may comprise a caster frame 56 coupled to the leg section 28B and rotatable relative to the leg section 28B around a steering axis S transverse to the seat axis A to facilitate turning the litter 24. The steerable wheel assembly 54 may further comprise a wheel 58 coupled to the caster frame 56 and rotatable relative to the caster frame 56 around a wheel axis W1 to facilitate movement of the litter 24 along the floor surface 38. The caster frame 56 is disposed in a transition position when the wheel axis W1 and the seat axis A are parallel. The steerable wheel assembly 54 may have any suitable configuration that facilitates movement of the litter 24 along the floor surface 38 and turning the litter 24. As shown in FIGS. 3 and 16, the steerable wheel assembly 54 is a pair of steerable wheel assemblies 54 spaced from one another to support the leg section 28B. However, any number of steerable wheel assemblies 54 may be utilized.

Turning to FIGS. 4-8, the support structure 28 may further comprise a foot section 28D coupled to the leg section 28B and arranged for translation relative to the leg section 28B between a first position associated with the seated configuration and a second position, different from the first position, associated with the supine configuration. More specifically, the foot section 28D may be disposed in the first position relative to the leg section 28B when the leg section 28B is disposed in the first angular position relative to the seat section 28A. The foot section 28D may be disposed in the second position relative to the leg section 28B when the leg section 28B is disposed in the second angular position relative to the seat section 28A.

The foot section 28D is used to accommodate kinematic differences between the articulation of the leg section 28B relative to the seat section 28A about the seat axis A and the articulation of the legs of the patient 22 at the knees. More specifically, the seat axis A and the axis of the knees are offset. This causes disparity between the length of leg section 28B and the length of the patient's 22 leg below the knee as the leg is rotated approximately 90 degrees with leg section 28B from the first angular position to the second angular position. Therefore, translating the foot section 28D from the first position to the second position as the support structure 28 articulates from supine configuration increases the overall length of litter 24 to accommodate the length disparities and ensure that the legs and feet are supported for the safety and comfort of the patient 22.

Accordingly, the translation of the foot section 28D between the first and second positions may be orthogonal to the seat axis A. Moreover, the foot section 28D may be closer to the seat section 28A in the first position (see FIG. 4) than the second position (see FIG. 8). However, the opposite may be true (i.e., the foot section 28D may be closer to the seat section 28A in the second position than the first position).

Figure 13:
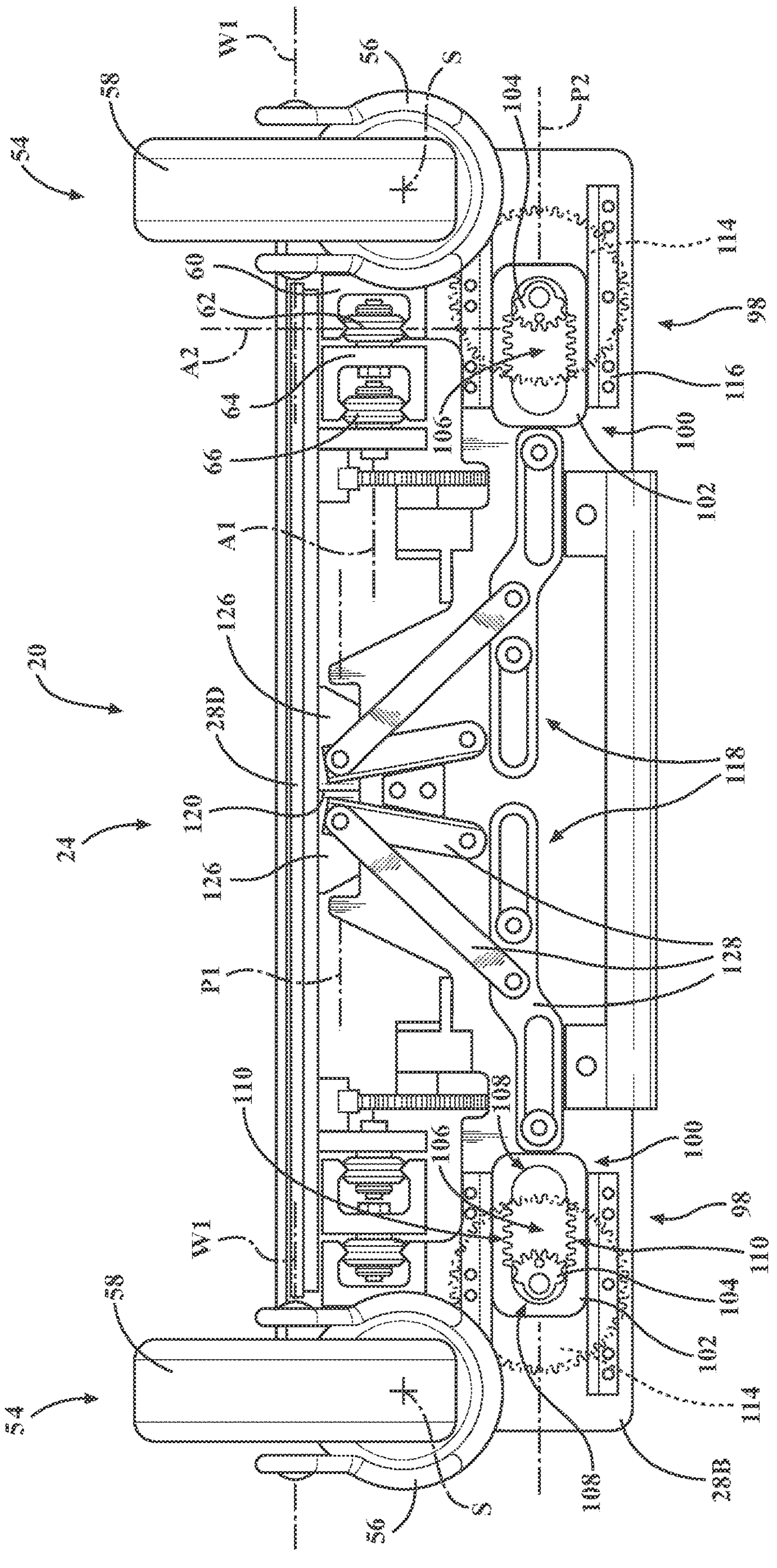
FIG. 13 is a bottom elevational view of the patient support apparatus of FIG. 3, showing a mangle gear rack of the wheel orientation mechanism in a second linear position and the caster frame in one of the pair of transition positions.
Figure 14:
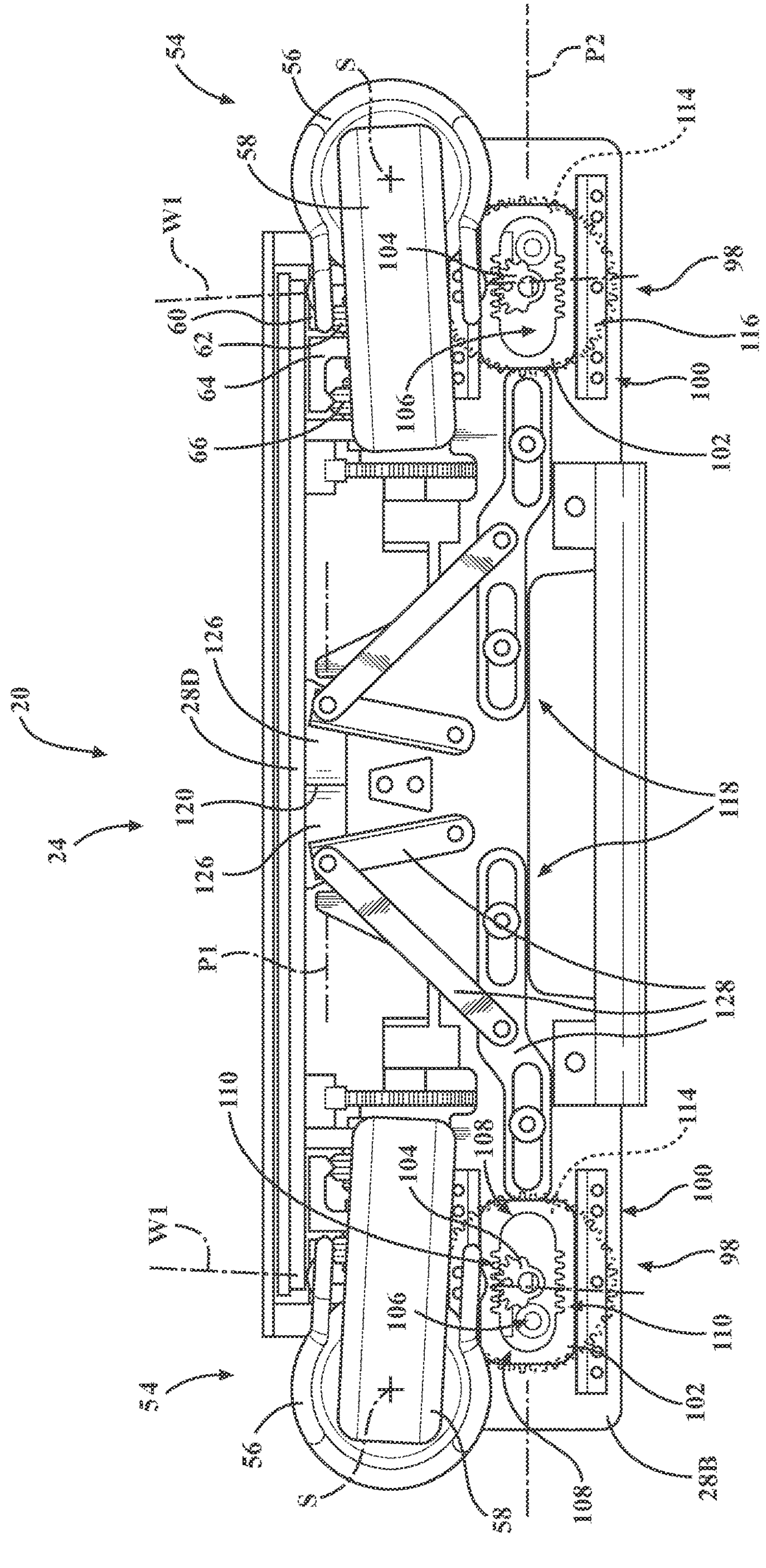
FIG. 14 is a bottom elevational view of the patient support apparatus of FIG. 3, showing the mangle gear rack of the wheel orientation mechanism between a first liner position and the second linear position, and the caster frame disposed between the pair of transition positions.

As shown in FIGS. 13-15, the patient support apparatus 20 may comprise a rail 60 mounted to at least one of the leg and foot sections 28B, 28D and longitudinally aligned with the translation of the foot section 28D between the first and second positions. The patient support apparatus 20 may further comprise a roller bearing 62 rotatably mounted to the other one of the leg and foot sections 28B, 28D and in engagement with the rail 60. The roller bearing 62 is configured to roll along the rail 60 and facilitate the translation of the foot section 28D. Furthermore, the roller bearing 62 and the rail 60 facilitate smooth translation of the foot section 28D between the first and second positions.

As shown in FIGS. 13-15, the rail 60 may be mounted to the leg section 28B such that the rail 60 is fixed to the leg section 28B. The roller bearing 62 may be mounted to the foot section 28D such that the roller bearing 62 is arranged to translate with the foot section 28D between the first and second positions. The roller bearing 62 rolls along the rail 60 as the foot section 28D moves between the first and second positions. However, the opposite may be true (i.e., the rail 60 may be mounted to and arranged to translate with the foot section 28D and the roller bearing 62 may be fixed to the leg section 28B).

The rail 60 and the roller bearing 62 may be configured to retain the foot section 28D to the leg section 28B and direct the translation of the foot section 28D along a path. More specifically, as shown in FIG. 13, the rail 60 may include a first portion and a second portion spaced from the first portion, with the roller bearing 62 disposed between and engaging each of the first and second portions. The roller bearing 62 is configured to roll along each of the first and second portions as the foot section 28D translates between the first and second positions. Furthermore, the rail 60 and the roller bearings 62 may have corresponding opposite V-shape configurations. The first and second portions of the rail 60 retain the roller bearing 62 along a first axis A1 orthogonal to the path along which the foot section 28D translates. The corresponding opposite V-shape configurations of the rail 60 and the roller bearings 62 retain the roller bearing 62 along a second axis A2 orthogonal to both the first axis A1 and the path along which the foot section 28D translates. As such, the rail 60 and the roller bearing 62 are configured to retain the foot section 28D relative to the leg section 28B in two of three dimensions. However, the rail 60 and the roller bearing 62 may have any suitable configuration to retain the foot section 28D to the leg section 28B and direct the translation of the foot section 28D along the path.

As shown in FIG. 13-15, the patient support apparatus 20 may further comprise a secondary rail 64 mounted to and arranged to translate with the roller bearing 62. The patient support apparatus 20 may further comprise a secondary roller bearing 66 rotatably mounted to the foot section 28D. The secondary roller bearing 66 rolls along the secondary rail 64 as the foot section 28D moves between the first and second positions. The configuration of the secondary rail 64 mounted to the roller bearing 62 facilitates further translation of the foot section 28D relative to the leg section 28B. More specifically, the distance that the foot section 28D translates relative to the leg section 28B is equal to the distance that the roller bearing 62 rolls along the rail 60 in addition to the distance that the secondary roller bearing 66 rolls along the secondary rail 64. As such, the secondary rail 64 and the secondary roller bearing 66 extend the translation of the foot section 28D relative to the leg section 28B. The rail 60 and the roller bearing 62, and the secondary rail 64 and the secondary roller bearing 66, collectively telescope to allow for compact packaging in the first position while facilitating translation equal to the collective distance of the rail 60 and the secondary rail 64.

The secondary rail 64 and the secondary roller bearing 66 may be configured in the same manner as the rail 60 and the roller bearing 62 described above. However, the secondary rail 64 and the secondary roller bearing 66 may have any suitable configuration to retain the foot section 28D to the leg section 28B and direct the translation of the foot section 28D along the path.

As shown in FIGS. 13-15, more than one rail 60 and roller bearing 62 (as well more than one secondary rail 64 and secondary roller bearing 66) may be used to further stabilize the foot section 28D relative to the leg section 28B. As one non-limiting example, the rail 60, the roller bearing 62, the secondary rail 64, and the secondary roller bearing 66 may be a pair of each individually disposed on opposing lateral sides of the leg and foot sections 28B, 28D. However, any number of rails 60, roller bearings 62, secondary rails 64, and secondary roller bearings 66 may be utilized.

Figure 9:
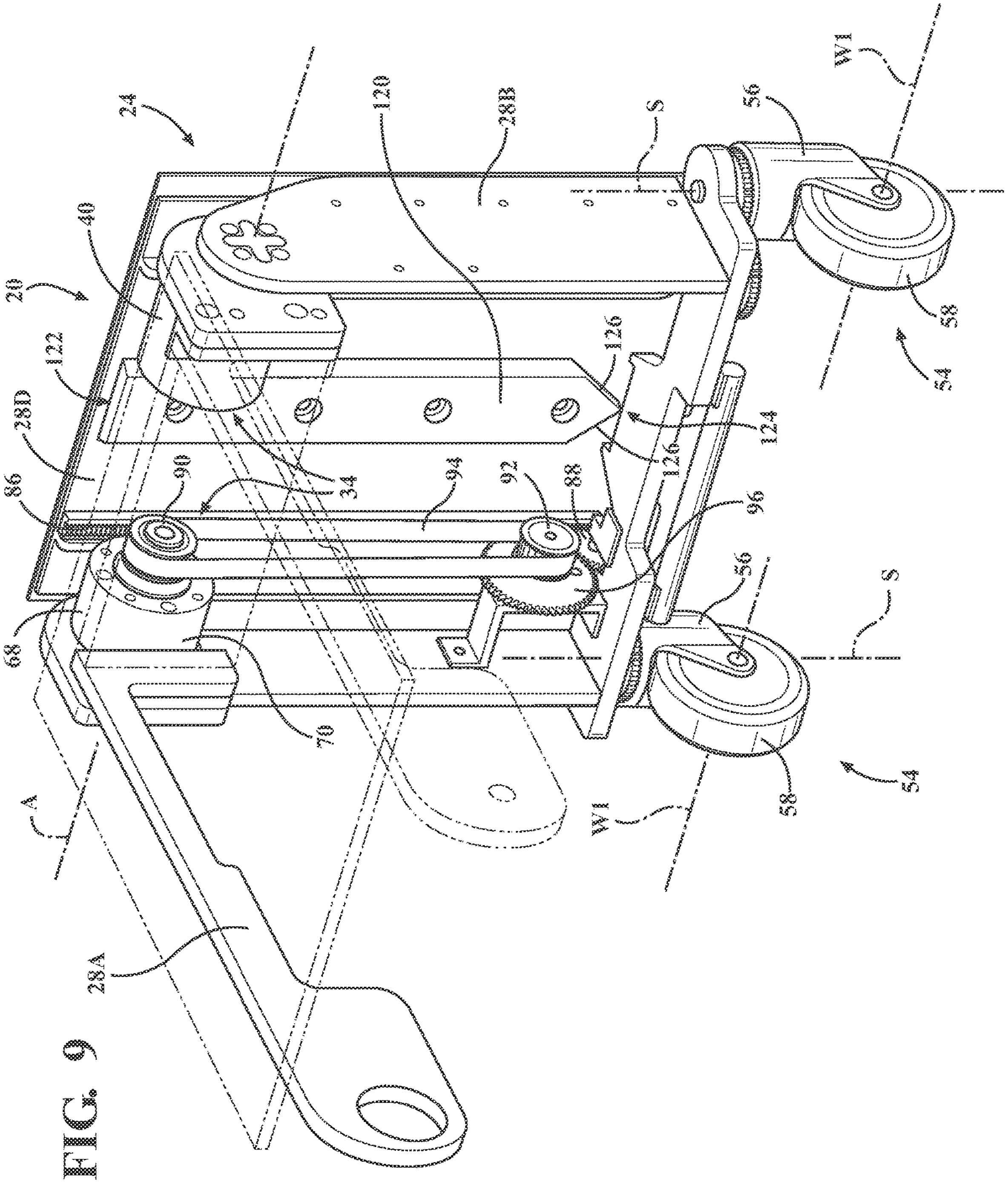
FIG. 9 is a perspective view of a portion of the patient support apparatus of FIG. 3, showing a litter actuation mechanism and a wedge.
Figure 23:
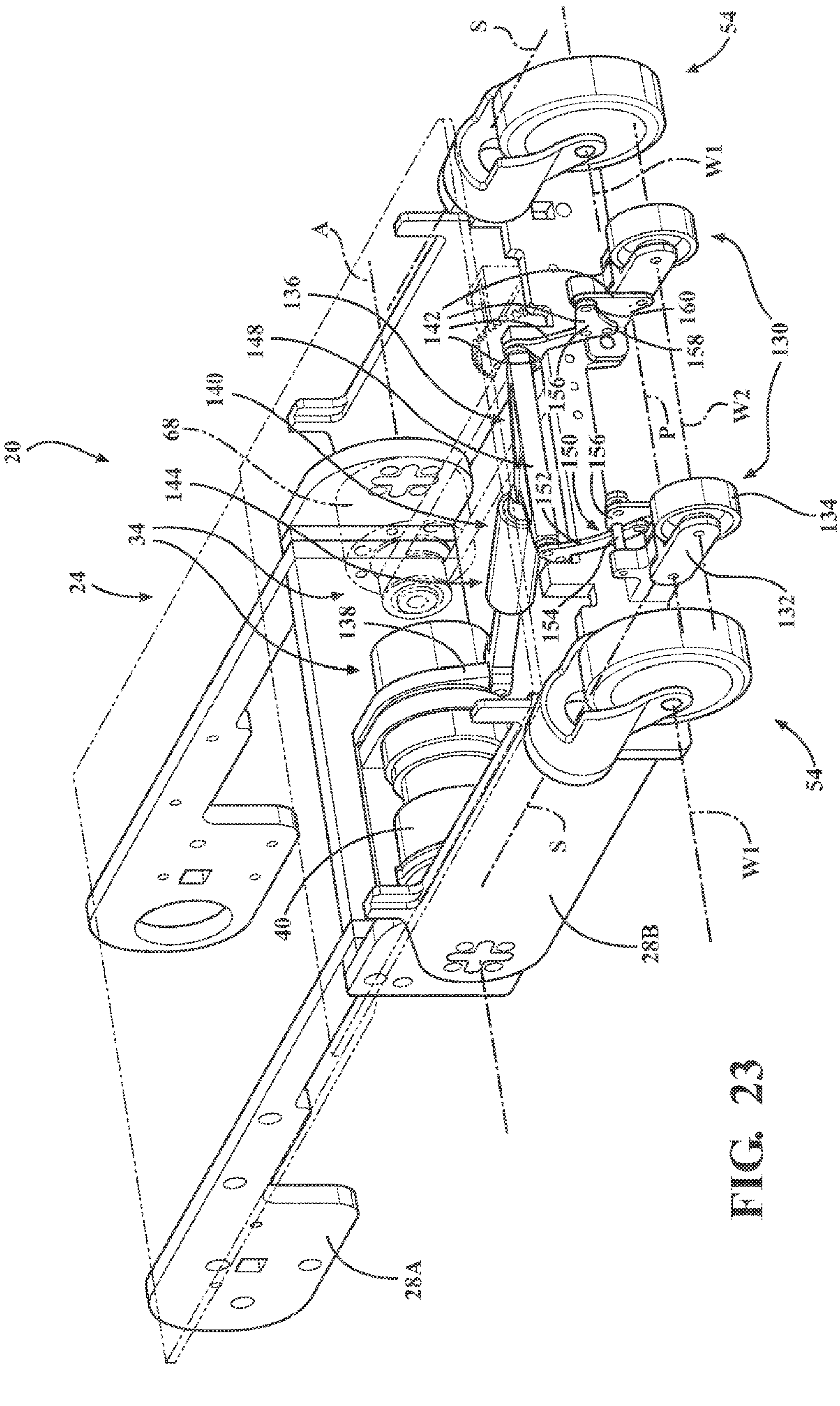
FIG. 23 is a perspective view of a portion of the patient support apparatus of FIG. 16, showing the wheel deployment mechanism and the wheel system.

The litter actuation mechanism 34 may simultaneously articulate the leg section 28B relative to the seat section 28A and translates the foot section 28D relative to the leg section 28B. More specifically, the litter actuation mechanism 34 may comprise a gear assembly 68 operably coupled to each of the leg section 28B and the foot section 28D, as shown in FIGS. 9 and 23. The gear assembly 68 may have a gear ratio. The gear assembly 68 may be configured to receive motion from the leg section 28B as the leg section 28B articulates between the first and second angular positions at a first rate. The gear assembly 68 may deliver motion to the foot section 28D to translate the foot section 28D between the first and second positions at a second rate, different than the first rate. Accordingly, articulation of the leg section 28B via the litter actuation mechanism 34 also drives translation of the foot section 28D without requiring a separate actuator. It will be appreciated that this configuration significantly contributes to improved overall weight of the litter 24.

Figure 10:
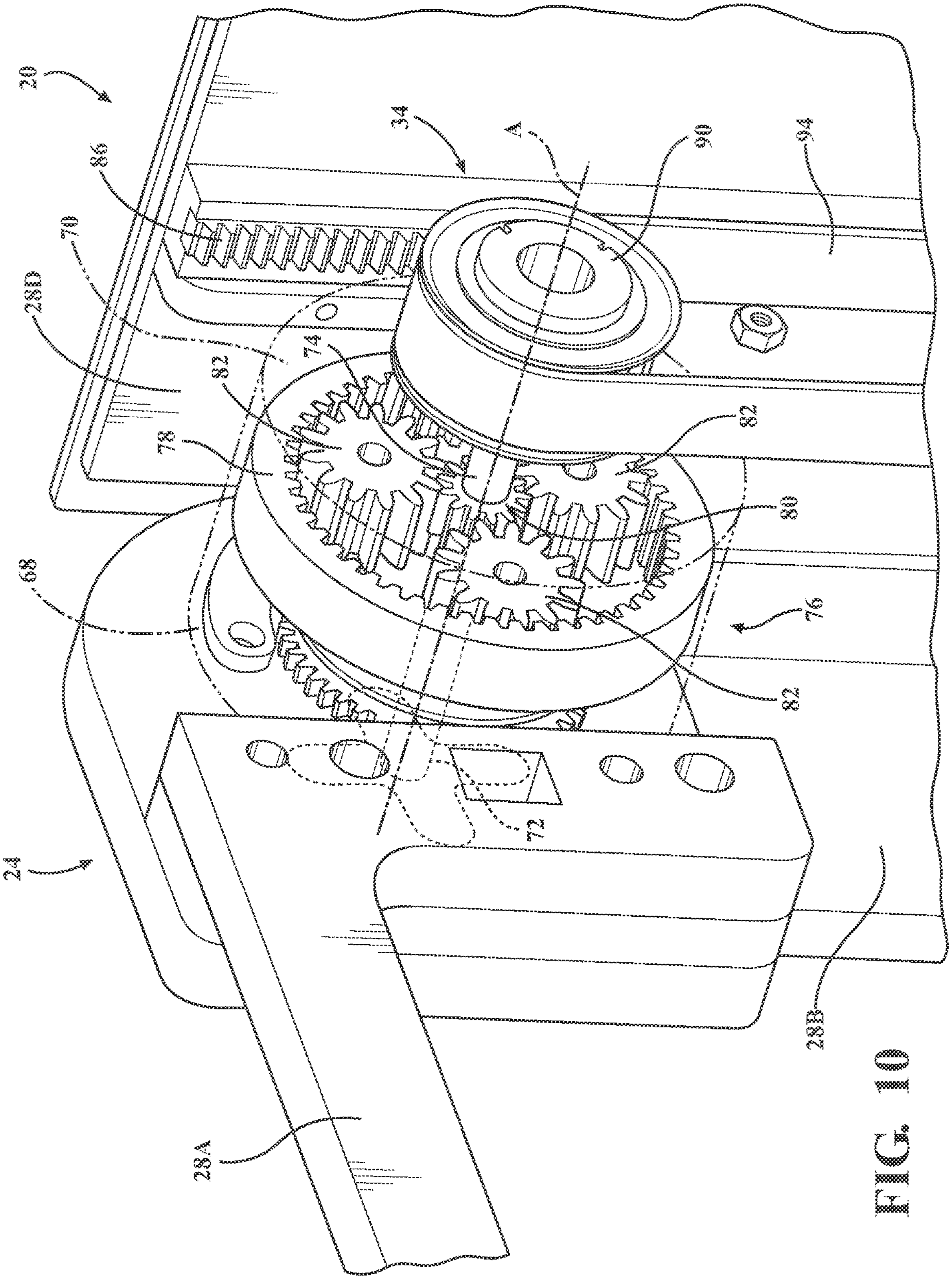
FIG. 10 is a perspective view of a portion of the patient support apparatus of FIG. 9, showing a gear assembly of the litter actuation mechanism.

As shown in FIG. 10, the gear assembly 68 may comprise a housing 70 fixed to the seat section 28A and an input shaft 72 coupled to the leg section 28B along the seat axis A. More specifically, the input shaft 72 may be splined to the leg section 28B along the seat axis A. The leg section 28B may be arranged to rotate the input shaft 72 at the first rate during the articulation between the first and second angular positions. The gear assembly 68 may further comprise an output shaft 74 coupled to the foot section 28D and a planetary gear set 76 having the gear ratio and coupled to each of the input and output shafts 72, 74 and configured to transmit the motion between the input and output shafts 72, 74. More specifically, the planetary gear set 76 comprises a ring gear 78 fixed to the housing 70, a sun gear 80 rotatably fixed to the output shaft 74, and a plurality of planet gears 82 disposed between the ring gear 78 and the sun gear 80 and radially spaced about the sun gear 80. The planetary gear set 76 further comprises a carrier rotatably fixed to each of the planet gears 82 and the input shaft 72. Rotation of the input shaft 72 at the first rate during the articulation of the leg section 28B between the first and second angular positions causes the carrier and the planet gears 82 to rotate around the ring gear 78 and drive rotation of the sun gear 80 (and the output shaft 74 fixed thereto) at the second rate. The diameter of number of teeth of each of the ring gear 78, the sun gear 80, and the planet gears 82 define the gear ratio. However, the gear assembly 68 may have any suitable gear configuration for receiving motion from the leg section 28B and delivering motion to the foot section 28D.

In one embodiment, the gear ratio is between 1:2 and 1:10. In another embodiment, the gear ratio is between 1:4 and 1:8. In yet another embodiment, the gear ratio is 1:6. However, the gear assembly 68 may have any suitable gear ratio that facilitates translation of the foot section 28D at a desired rate relative to the rate of articulation of the leg section 28B.

As shown in FIG. 9, the litter actuation mechanism 34 may further comprise a gear rack 86 coupled to the foot section 28D and longitudinally aligned in a direction following the translation of the foot section 28D between the first and second positions. The litter actuation mechanism 34 may further comprise a pinion gear 88 coupled to the output shaft 74 and disposed in meshed engagement with the gear rack 86. The pinion gear 88 may be rotatably mounted to the leg section 28B. The pinion gear 88 may be configured to receive motion from the output shaft 74 and rotates in engagement with the gear rack 86 to translate the foot section 28D between the first and second positions. The rotation of the pinion gear 88, which is rotatably mounted to the leg section 28B and meshed with the gear rack 86, causes corresponding linear movement of the gear rack 86. Because the gear rack is coupled to the foot section 28D, the foot section 28D moves with the gear rack 86 between the first and second positions. Although not shown in the Figures, the opposite may be true: the gear rack 86 may be coupled to the leg section 28B and the pinion gear 88 may be coupled to the foot section 28D. Furthermore, the litter actuation mechanism 34 may interface with the foot section 28D in any suitable manner to receive motion from the output shaft 74 and translate the foot section 28D between the first and second positions.

As shown in FIG. 9, the patient support apparatus 20 may further comprise a first pulley 90 coupled to the output shaft 74 and a second pulley 92 coupled to the pinion gear 88. The patient support apparatus 20 may comprise a belt 94 extending between and engaging each of the first and second pulleys 90, 92 to transmit motion between the first and second pulleys 90, 92. More specifically, the belt 94 may be tensioned between the first and second pulleys 90, 92 such that friction between the belt 94 and the first and second pulleys 90, 92 facilitates the transmission of motion between the first and second pulleys 90, 92. As such, rotation of the output shaft 74 and the first pulley 90 causes rotation of the second pulley 92 and the pinion gear 88. The patient support apparatus 20 may further comprise an intermediate gear 96 meshed with the pinion with the pinion gear 88 and rotatably fixed to the second pulley 92 such that the intermediate gear 96 couples the second pulley 92 to the pinion gear 88. Furthermore, any number of intermediate gears 96 may be disposed between the second pulley 92 and the pinion gear 88 to couple the second pulley 92 to the pinion gear 88 for concurrent rotation but not necessarily at the same rotational speed.

While the illustrated embodiment employs the first and second pulleys 90, 92, it will be appreciated that the output shaft 74 may be coupled to the pinion gear 88 in any suitable manner. For example, one or more linkages may be coupled to the output shaft 74 and the pinion gear 88 to transmit rotation between the output shaft 74 and the pinion gear 88 (similar to connecting rods that connect drive wheels on a locomotive). Furthermore, the linear actuation mechanism may have any suitable configuration sufficient to facilitate simultaneously articulating the leg section 28B relative to the seat section 28A and translating the foot section 28D relative to the leg section 28B.

Accordingly, the simultaneous articulation of the leg section 28B relative to the seat section 28A and translation of the foot section 28D relative to the leg section 28B facilitated by the litter actuation mechanism 34 improves the ease with which the patient support apparatus 20 may be used by reducing the operational procedures required of an emergency responder to accommodate the litter 24 to the patient 22. Furthermore, the simultaneous articulation and translation reduces the time that is required to accommodate the litter 24 to the patient 22, which is critical in emergency situations when time is of the essence. The litter actuation mechanism 34 also provides the advantage of requiring only one drive unit (i.e., a manually operated drive, electric motor, pneumatic pump, etc.) to simultaneously articulate the leg section 28B relative to the seat section 28A and translate of the foot section 28D relative to the leg section 28B, which reduces the weight of the litter 24 compared to multiple drive units that would otherwise be required to independently articulate the leg section 28B and translate the foot section 28D.

The articulation of the support structure 28 between the seated and supine configurations causes the leg section 28B to move along the floor surface 38 under certain conditions (as illustrated in FIGS. 4-7 and 17-19). The leg section 28B may utilize a low-friction device to facilitate movement of the leg section 28B along the floor surface 38. Examples of low-friction devices include, but are not limited to, low-friction pads, rollers, and wheels.

In one embodiment shown in FIGS. 4-7, the steerable wheel assembly 54 facilitates movement of the leg section 28B along the floor surface 38. However, to facilitate efficient rotation of the wheel 58 about the wheel axis W1 and movement of the leg section 28B along the floor surface 38, the wheel axis W1 must be parallel to the seat axis A (i.e., the caster frame 56 of the steerable wheel assembly 54 is disposed in the transition position) to ensure that the wheel 58 rotates and does not bind or drag against the floor surface 38 in response to articulation of the support structure 28 (i.e., by rotation of the caster frame 56 inwardly or outwardly). For this reason, the patient support apparatus 20 may comprise a wheel orientation mechanism 98 (see FIGS. 11-15) operably coupled to each of the leg section 28B and the steerable wheel assembly 54, with the wheel orientation mechanism 98 configured to rotate the caster frame 56 around the steering axis S to the transition position when the leg section 28B articulates between the first and second angular positions for maintaining rotation of the wheel 58 around the wheel axis W1 along the floor surface 38 as the support structure 28 articulates between the seated and supine configurations.

The wheel orientation mechanism 98 may comprise a reciprocating mechanism 100 coupled to the leg section 28B and arranged to linearly move between a first linear position (see FIG. 15) and a second linear position (see FIG. 13) spaced from the first linear position. The reciprocating mechanism 100 may be configured to rotate the caster frame 56 to the transition position when the reciprocating mechanism 100 is moved to either of the first and second linear positions. More specifically, the transition position may be further defined as a pair of transition positions opposing one another by 180 degrees of rotation of the caster frame 56 about the steering axis S. The wheel axis W1 is parallel to the seat axis A in each of the pair of transition positions. The first linear position of the reciprocating mechanism 100 may correspond to one of the pair of transition positions and the second linear position of the reciprocating mechanism 100 may correspond to the other one of the pair of transition positions.

As shown in FIGS. 11-15, the steering axis S of the caster frame 56 and the wheel axis W1 of the wheel 58 may be offset. Said differently, the steering axis S and the wheel axis W1 do not intersect. The offset between the steering axis S and the wheel axis W1 facilitates rotation of the wheel 58 and the caster frame 56 about the steering axis S. More specifically, the friction between the wheel 58 and the floor surface 38 offset from the steering axis S imparts torque on the wheel 58 and the caster frame 56 about the steering axis S, which results in rotation of the wheel 58 and the caster frame 56 about the steering axis S.

Furthermore, the offset may facilitate unobstructed articulation of the support structure 28 between the seated and supine configurations. More specifically, the wheel axis W1 may be arranged to be disposed below the steering axis S in the supine configuration when the transition position of the caster frame 56 corresponds to the first linear position of the reciprocating mechanism 100 for preventing contact between the foot section 28D and the floor surface 38. Said differently, the wheel axis W1 (and a portion of the wheel 58) may be arranged to be disposed between the steering axis S and floor surface 38 in the supine configuration when the transition position of the caster frame 56 corresponds to the first linear position. Accordingly, the wheel 58 spaces the leg section 28B from the floor surface 38 in and between the supine and seated configurations when the transition position of the caster frame 56 corresponds to the first linear position. Moreover, the spacing created by the wheel 58 when disposed in the transition position corresponding to the first linear position also spaces the foot section 28D from floor surface 38 in and between the supine and seated configurations. More specifically, the spacing created by the wheel 58 allows the foot section 28D to translate between the first and second positions without contacting the floor surface 38 as the support structure 28 articulates between the supine and seated configurations. However, the steering axis S and the wheel axis W1 may intersect and the wheel axis W1 may be disposed above the steering axis S in the supine configuration without escaping the scope of the subject disclosure.

As shown in FIGS. 13 and 14, the reciprocating mechanism 100 may comprise a mangle gear rack 102 arranged to linearly move between the first and second linear positions and a pinion gear 104 rotatably coupled to the caster frame 56 and disposed in meshed engagement with the mangle gear rack 102. The linear movement of the mangle gear rack 102 and corresponding rotation of the pinion gear 104 may facilitate rotation of the caster frame 56. To this end, the mangle gear rack 102 may define a slot 106 extending between a pair of ends 108 and having a pair of longitudinal sides 110 extending between the ends 108. Each of the longitudinal sides 110 may have teeth configured to engage the pinion gear 104. The teeth of each of the longitudinal sides 110 may facilitate rotation of the caster frame 56 one hundred and eighty degrees between the pair of transition positions that correspond to the pair of ends 108 of the slot 106. As shown in FIGS. 13 and 15, when the pinion gear 104 is disposed at one of the pair of ends 108 of the slot 106, the caster frame 56 is disposed in one of the pair of transition positions. When the pinion gear 104 is disposed at the other one of the pair of ends 108 of the slot 106, the caster frame 56 is disposed in the other one of the pair of transition positions.

In the illustrated embodiment, disposition of the pinion gear 104 between the pair of ends 108 of the slot 106 directly corresponds to the rotational position of the caster frame 56 about the steering axis S between the transition positions. Here, the pinion gear 104 may have a hemi-spherical configuration with the pinion gear 104 configured to engage the teeth of one of the pair of longitudinal sides 110 between pair of ends 108. The pinion gear 104 rotates along the teeth of that longitudinal side 110 between pair of ends 108 of the slot 106, as shown in FIG. 14. When the pinion gear 104 reaches either of the pair of ends 108, the pinion gear 104 rotates into engagement with teeth of the other one of the pair of pair of longitudinal sides 110, as shown in FIG. 13. The pinion gear 104 may then rotate along the teeth of that longitudinal side 110 between pair of ends 108 of the slot 106. When the pinion gear 104 reaches either of the pair of ends 108, the pinion gear 104 rotates into engagement with teeth of the other one of pair of longitudinal sides 110. As such, the pinion gear 104 switches engagement between the teeth on the opposing longitudinal sides 110 when the pinion gear 104 reaches the pair of ends 108 of the slot 106.

Figure 11:
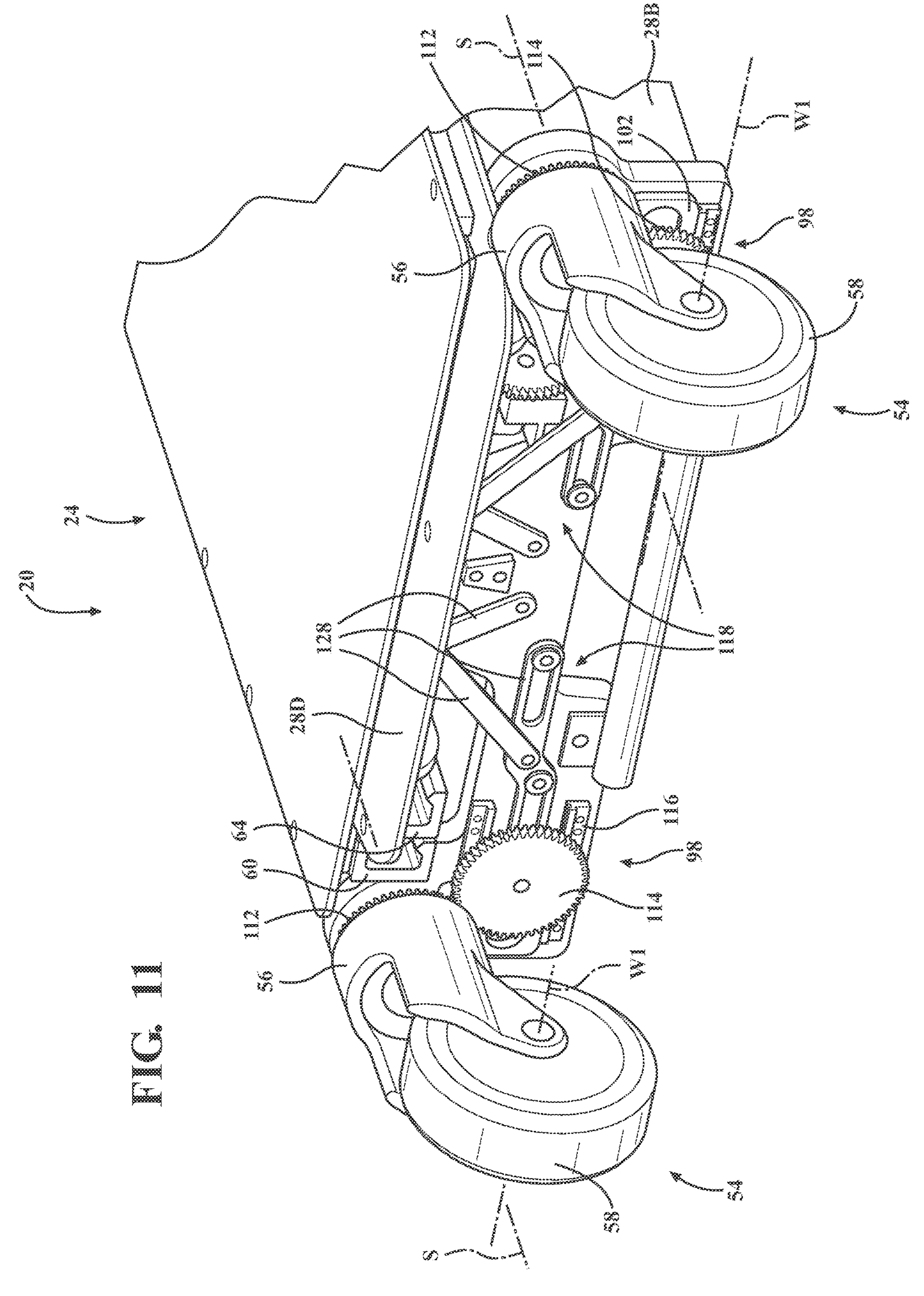
FIG. 11 is a perspective view of a portion of the patient support apparatus of FIG. 3, showing a steerable wheel assembly having a caster frame disposed in one of a pair of transition positions and a wheel orientation mechanism.
Figure 12:
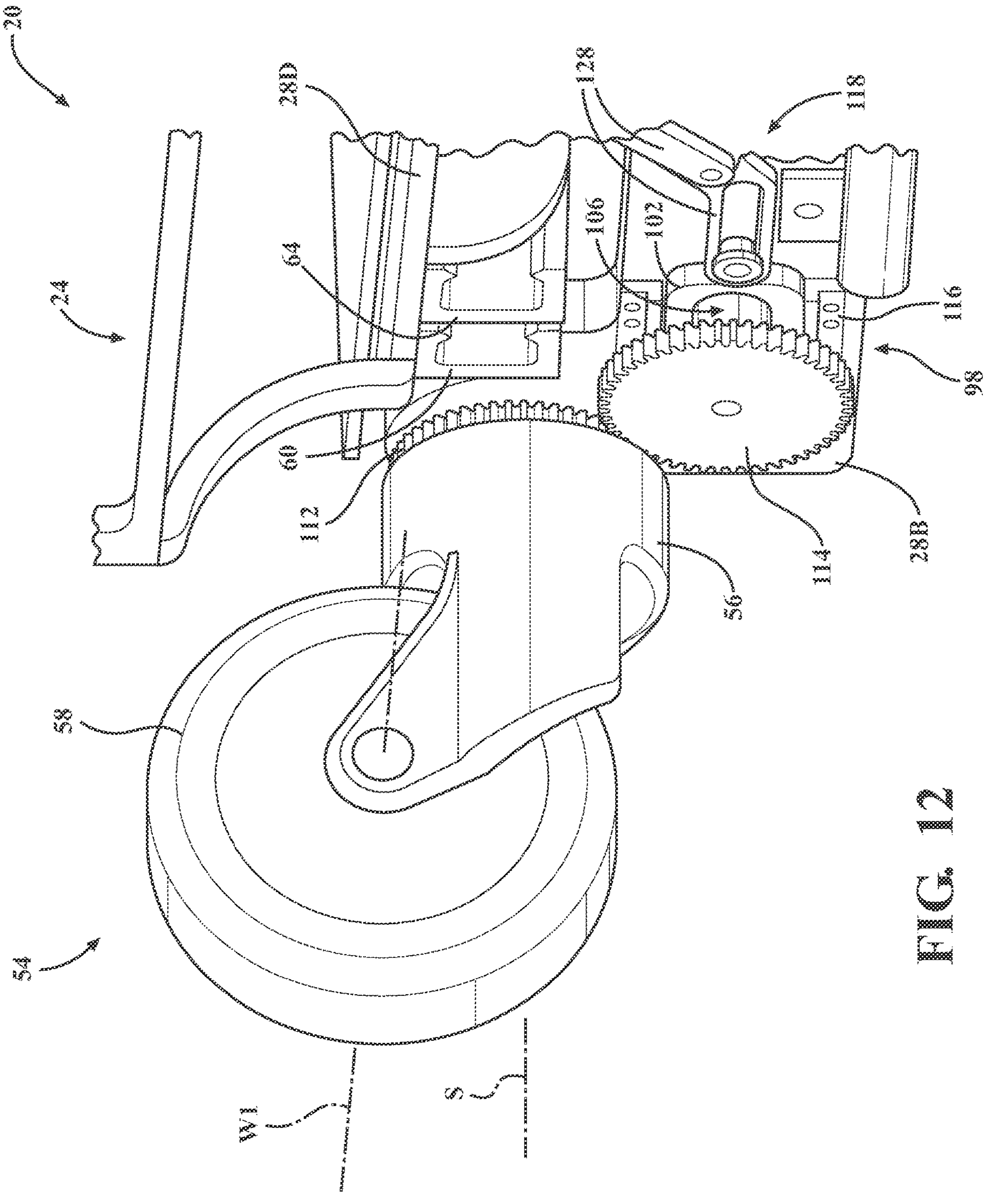
FIG. 12 is a perspective view of a portion of the patient support apparatus of FIG. 3, showing a first spur gear fixed to the caster frame and a second spur gear coupled to the wheel orientation mechanism and engaging the first spur gear.

The pinion gear 104 may be rotatably coupled to the caster frame 56. As shown in FIGS. 11 and 12, the steerable wheel assembly 54 may comprise a first spur gear 112 fixed to the caster frame 56 and rotatable about the steering axis S with the caster frame 56. The reciprocating mechanism 100 may comprise a second spur gear 114 fixed to and axially aligned with the pinion gear 104 such that the second spur gear 114 rotates with the pinion gear 104. The first and second spur gears 112, 114 may engage one another such that rotation of the pinion gear 104 corresponds rotation of the caster frame 56 about the steering axis S. However, the pinion gear 104 may be rotatably coupled to the caster frame 56 in any suitable manner.

With attention to FIGS. 13 and 15, the disposition of the pinion gear 104 at either of the pair of ends 108 of the slot 106 may individually correspond with the pair of transition positions of the caster frame 56. Said differently, the caster frame 56 is disposed in one of the pair of transition positions when the pinion gear 104 is disposed at one of the pair of ends 108 of the slot 106. The caster frame 56 is disposed in the other one of the pair of transition positions when the pinion gear 104 is disposed at the other one of the pair of ends 108 of the slot 106. Engagement of the pinion gear 104 with the teeth of the mangle gear rack 102 along one of the pair of longitudinal sides 110 corresponds to rotation of the caster frame 56 between one of the pair of 180 degrees of rotation between the transition positions. Engagement of the pinion gear 104 with the teeth of the mangle gear rack 102 along the other one of the pair of longitudinal sides 110 corresponds to rotation of the caster frame 56 between the other one of the pair of 180 degrees of rotation between the transition positions, as generally shown in FIG. 14.

Accordingly, movement of the mangle gear rack 102 between the first and second linear positions results in rotation of the caster frame 56 between the pair of positions. The pinion gear 104 is disposed at one end 108 of the slot 106 in one of the first and second linear positions and the pinion gear 104 is disposed at the other end 108 of the slot 106 in the other one of the first and second linear positions.

As illustrated between FIGS. 13 and 14, the mangle gear rack 102 may move substantially parallel to the seat axis A.

The mangle gear rack 102 may move outwardly toward the steerable wheel assembly 54 and inwardly toward the center of the leg section 28B. The mangle gear rack 102 may be closer to the steerable wheel assembly 54 in the first linear position than the second linear position. As such, movement of the mangle gear rack 102 outwardly toward the first linear position facilitates rotation of the caster frame 56 about the steering axis S to the transition position with the wheel axis W1 arranged to be disposed below the steering axis S in the supine configuration.

The leg section 28B may further comprise a track 116 extending parallel to the slot 106 and configured to receive the mangle gear rack 102. The track 116 may support the mangle gear rack 102 relative to the leg section 28B as the mangle gear rack 102 moves between the first and second linear positions. More specifically, the track 116 may define a channel parallel to the slot 106 with the mangle gear rack 102 movable within the channel between the first and second linear positions.

As shown in FIGS. 11 and 13-15, the patient support apparatus 20 may further comprise an actuating device 118 coupled to the leg section 28B and arranged to abut and move the reciprocating mechanism 100 from the first linear position, or any position between the first and second linear positions, to the second linear position to rotate the caster frame 56 to the transition position when the leg section 28B articulates from the first angular position to the second angular position. More specifically, the actuating device 118 may abut (see FIGS. 13 and 14) and move the mangle gear rack 102 outwardly toward the first linear position (see FIG. 15), which facilitates rotation of the caster frame 56 about the steering axis S to the transition position. In the transition position, the wheel axis W1 is arranged to be disposed below the steering axis S in the supine configuration.

The patient support apparatus 20 may further comprise a wedge 120 (see FIG. 9) arranged for translation relative to the leg section 28B between a first position associated with the seated configuration and a second position, different from the first position, associated with the supine configuration, and arranged to engage and move the actuating device 118 into abutment with the reciprocating mechanism 100. More specifically, the wedge 120 may extend longitudinally along the leg section 28B between a proximal end 122 adjacent the seat section 28A and a distal end 124 adjacent the steerable wheel assembly 54. The wedge 120 may be mounted to the foot section 28D. The foot section 28D may be arranged to translate the wedge 120 between the first and second positions. One having skill in the art will appreciate that the first and second positions of the wedge 120 and the first and second positions of the foot section 28D may be synonymous.

The wedge 120 may have a transition surface 126 extending at an angle outwardly from the distal end 124 to the proximal end 122 to progressively move the actuating device 118 as the wedge 120 moves from the first position to the second position. More specifically, the transition surface 126 of the wedge 120 may abut the actuating device 118 as the wedge 120 move from the first position toward the second position. The actuating device 118 may move outwardly toward the steerable wheel assembly 54 as the actuating device 118 moves along the transition surface 126 from the distal end 124 toward the proximal end 122.

As shown in FIGS. 13-15, the wedge 120 may move along a first plane P1 and the reciprocating mechanism 100 may move along a second plane P2 spaced from and parallel to the first plane P1. As such, the actuating device 118 may comprise a plurality of links 128 hinged to one another. The plurality of links 128 transmit movement between the first and second planes P1, P2. More specifically, the plurality of links 128 extend between a first end configured to abut the transition surface 126 and a second end configured to abut the mangle gear rack 102. The second end of the plurality of links 128 may be arranged to abut and move the mangle gear rack 102 toward the first linear position from the second linear position or between the first and second linear positions. Moreover, the first end of the plurality of links 128 may be arranged to abut the transition surface 126 as the wedge 120 moves from the first position to the second position.

The first end of each of the links 128 abuts the transition surface 126 and the second end of each of the links 128 abuts the mangle gear rack 102 at some position at or between the first and second positions of the wedge 120 and the foot section 28D. The plurality of links 128 couple the wedge 120 with the mangle gear rack 102. Further movement of the wedge 120 and the foot section 28D toward the second position facilitates movement of the mangle gear rack 102 toward the first linear position and rotates the caster frame 56 toward the transition position. The first and second ends maintain abutment with the wedge 120 and the mangle gear rack 102 when the wedge 120 is in the second position. As such, the wheel orientation mechanism 98 may retain the caster frame 56 in the transition position as the leg section 28B articulates between the first and second angular positions. More specifically, the wheel orientation mechanism 98 may retain the caster frame 56 in the transition position when the leg section 28B is in the second angular position.

Movement of the wedge 120 and the foot section 28D from the second position toward the first position separates the first end of the links 128 from abutment with the wedge 120 and decouples the wedge 120 from the mangle gear rack 102. Here, the mangle gear rack 102 is free to move from the first linear position toward the second linear position and the caster frame 56 is free to rotate about the steering axis S.

Accordingly, the wheel orientation mechanism 98 provides the advantage of positioning the wheel axis W1 of the wheel 58 of the steerable wheel assembly 54 parallel to the seat axis A to facilitate efficient rotation of the wheel 58 about the wheel axis W1 and movement of the leg section 28B along the floor surface 38. Otherwise, the wheel 58 will not rotate about the wheel axis W1 and the wheel 58 will bind and/or drag against the floor surface 38 in response to articulation of the support structure 28. The wheel orientation mechanism 98 automatically positions the wheel axis W1 parallel to the seat axis A when the support structure 28 articulates between the seated and supine configurations. This reduces the operational procedures required of an emergency responder to accommodate the litter 24 to the patient 22 and reduces the time that is required to articulate the support structure 28 between the seated and supine configurations, which is critical in emergency situations when time is of the essence. Furthermore, the wheel orientation mechanism 98 also provides the advantage of requiring only one drive unit (i.e., a manually operated drive, electric motor, pneumatic pump, etc.) to simultaneously articulate the leg section 28B relative to the seat section 28A and rotate the caster frame 56 about the steering axis S, which reduces the weight of the litter 24 compared to multiple drive units that would otherwise be required to independently articulate the leg section 28B and rotate the caster frame 56.

As an alternative to the wheel orientation mechanism 98, the patient support apparatus 20 may comprise a wheel system 130 (see FIGS. 20-23) coupled to the leg section 28B and configured to engage the floor surface 38 between the seated and supine configurations. The wheel system 130 may comprise a deployment frame 132 coupled to the leg section 28B and rotatable relative to the leg section 28B around a pivot axis P. The wheel system 130 may further comprise a wheel 134 coupled to the deployment frame 132 and rotatable relative to the deployment frame 132 around a wheel axis W2 parallel to the seat axis A to facilitate movement of the litter 24 along the floor surface 38. The patient support apparatus 20 may further comprise a wheel deployment mechanism 136 coupled to each of the seat section 28A and the wheel system 130. The wheel deployment mechanism 136 may be configured to rotate the deployment frame 132 around the pivot axis P when the leg section 28B articulates between the first and second angular positions. The wheel 134 may engage and rotate around the wheel axis W2 along the floor surface 38 as the support structure 28 articulates between the seated and supine configurations and lifts the steerable wheel assembly 54 off the floor surface 38.

The deployment frame 132 may rotate relative to the leg section 28B around the pivot axis P between a retracted position (see FIGS. 17 and 20) and a deployed position (see FIGS. 18, 19, and 21-23). The wheel axis W2 may be closer to the seat axis A in the retracted position than in the deployed position. However, the opposite may be true (i.e., the wheel axis W2 may be closer to the seat axis A in the deployed position than in the retracted position). Furthermore, the deployment frame 132 may be disposed in the retracted position when the leg section 28B is in the first angular position (see FIGS. 17 and 20) and the deployment frame 132 may be disposed in the deployed position when the leg section 28B is in the second angular position (see FIGS. 19, 22, and 23). However, the opposite may be true (i.e., the deployment frame 132 may be disposed in the deployed position when the leg section 28B is in the first angular position and the deployment frame 132 may be disposed in the retracted position when the leg section 28B is in the second angular position).

As shown in FIG. 23, the seat section 28A may comprise a mounting frame 138 spaced from the seat axis A, with the wheel deployment mechanism 136 coupled to the mounting frame 138. The mounting frame 138 may extend longitudinally from the seat section 28A; however, the mounting frame 138 may be located at any suitable position relative to the seat section 28A. The wheel deployment mechanism 136 may comprise an actuating arm 140 extending longitudinally along the leg section 28B and spaced from the pivot axis P to provide torque to the deployment frame 132 of the wheel system 130 about the pivot axis P. More specifically, the actuating arm 140 may extend between a first end and a second end. The first end of the actuating arm 140 may be pivotally mounted to the mounting frame 138. The second end of the actuating arm 140 may be spaced from the pivot axis P. Articulation of the leg section 28B relative to the seat section 28A causes the second end of the actuating arm 140 to move about the pivot axis P and exert torque on the deployment frame 132. However, the actuating arm 140 may be disposed in any suitable configuration to facilitate rotation of the deployment frame 132 about the pivot axis P in any suitable manner.

The wheel deployment mechanism 136 may comprise at least one link 142 coupled to the actuating arm 140 and to the deployment frame 132 of the wheel system 130 spaced from the pivot axis P to transmit the torque to the deployment frame 132. More specifically, the at least one link 142 may be coupled to the second end of the actuating arm 140 and to the deployment frame 132 between the pivot axis P and the wheel axis W2. Accordingly, the coupling of the at least one link 142 spaced from the pivot axis P facilitates transmission of torque exerted by the actuating arm 140 to the deployment frame 132. The at least one link 142 may be coupled to the actuating arm 140 and the deployment frame 132 in any suitable configuration.

Figure 20:
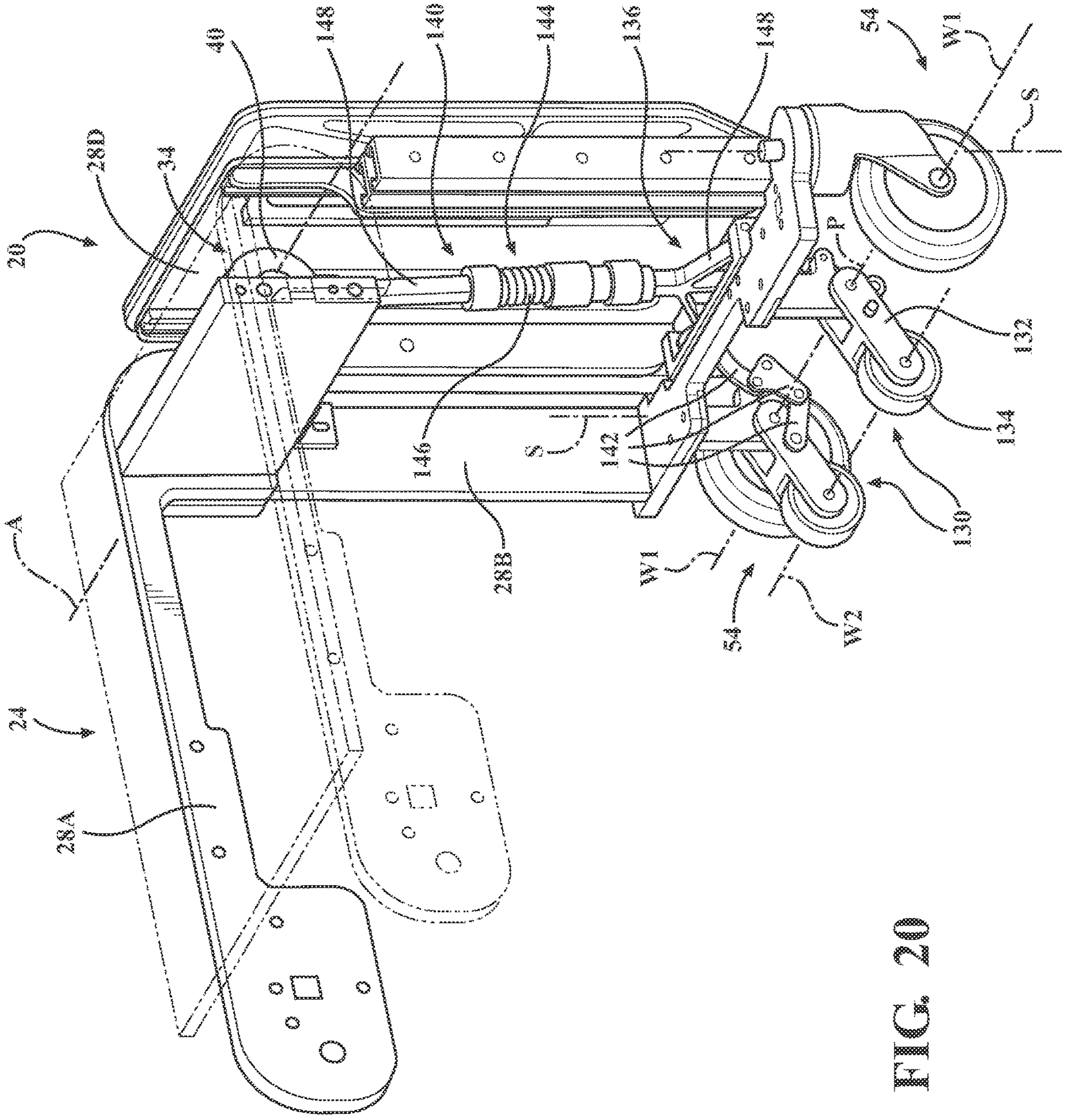
FIG. 20 is a perspective view of a portion of the patient support apparatus of FIG. 16, showing a wheel deployment mechanism and a deployment frame of the wheel system in a retracted position.
Figure 21:
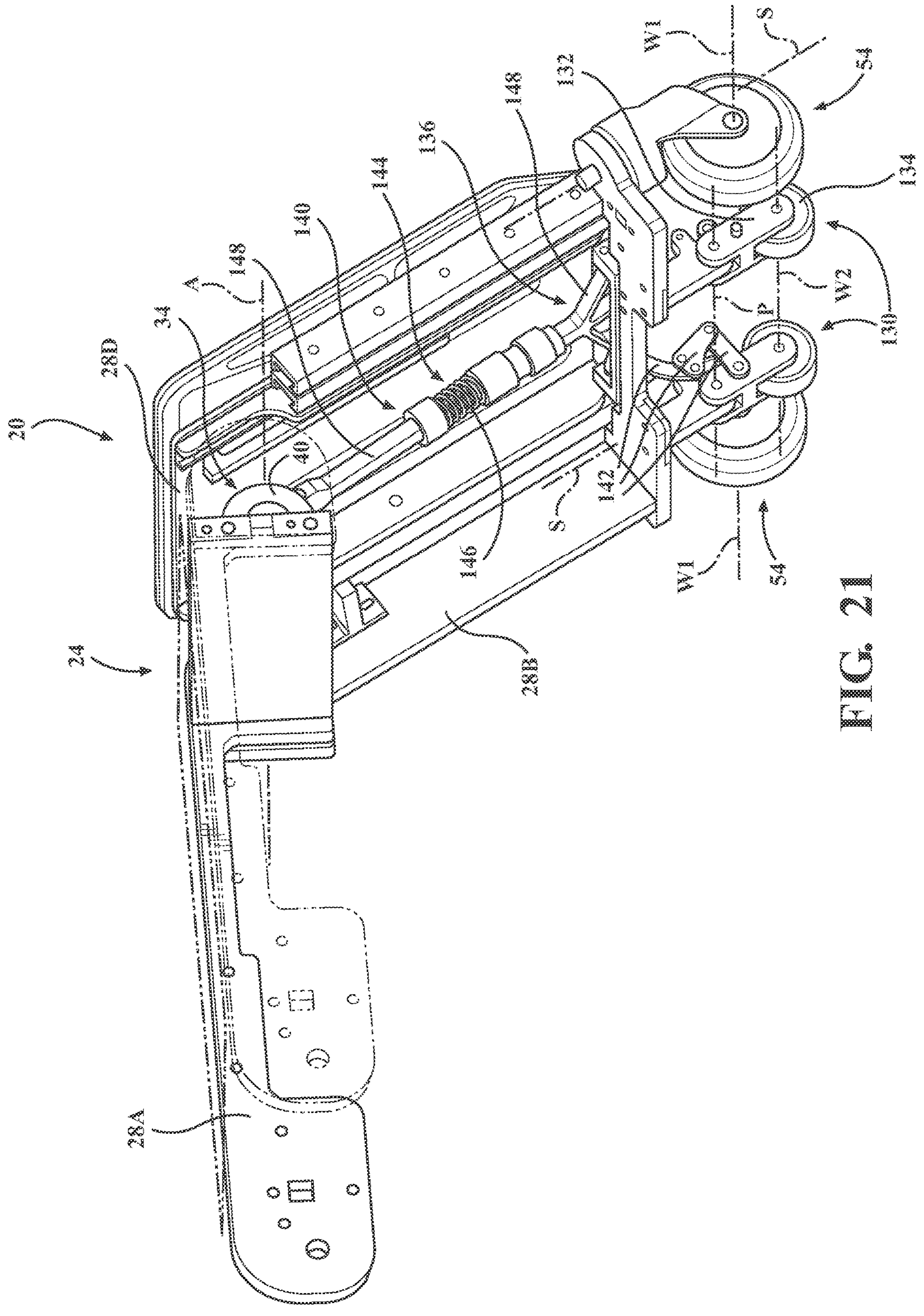
FIG. 21 is a perspective view of a portion of the patient support apparatus of FIG. 16, showing the wheel deployment mechanism and the deployment frame of the wheel system in a deployed position.

As shown in FIGS. 20 and 21, the wheel deployment mechanism 136 may comprise a lost motion device 144 configured to rotate the deployment frame 132 around the pivot axis P during an active portion of the articulation of the leg section 28B between the first and second angular positions. The lost motion device 144 may be configured to inhibit rotation of the deployment frame 132 around the pivot axis P during an inactive portion of the articulation of the leg section 28B between the first and second angular positions. More specifically, the active portion may refer to a range of angular positions between and/or at the first and second angular positions during which the deployment frame 132 rotates around the pivot axis P. The inactive portion refers to a range of angular positions between and/or at the first and second angular positions during which the deployment frame 132 does not rotate around the pivot axis P.

In the embodiment shown in the Figures, the active portion ranges from the first angular position (see FIGS. 17 and 20) to an intermediate angular position (see FIG. 21) between the first and second angular positions. The inactive portion ranges from the second angular position to the intermediate angular position (see FIGS. 18 and 19). Accordingly, the lost motion device 144 is configured to inhibit rotation of the deployment frame 132 around the pivot axis P between the second angular position (i.e., the supine configuration) and the intermediate angular position (i.e., between the supine and seated configurations) to maintain the deployment frame 132 in the deployed position (which allows the wheel 134 to rotate along the floor surface 38 and keeps the steerable wheel assembly 54 lifted off the floor surface 38). Furthermore, the lost motion device 144 is configured to rotate the deployment frame 132 around the pivot axis P between the first angular position (i.e., the seated configuration) and the intermediate angular position (i.e., between the supine and seated configurations) to rotate the deployment frame 132 between the deployed position in the intermediate position and the retracted position in the first angular position (which allows the steerable wheel assembly 54 to engage the floor surface 38 and steer the litter 24). However, in other embodiments, the active portion may range from the second angular position to the intermediate angular position and the inactive portion may range from the first angular position to the intermediate angular position. Furthermore, the wheel deployment mechanism 136 may be configured to correspond the active portion to any range(s) of angular positions and the inactive portion to any range(s) of angular positions without escaping the scope of the subject disclosure.

As shown in FIGS. 20 and 21, the lost motion device 144 may comprise a biasing member 146 coupled to each of the seat section 28A and the wheel system 130. The lost motion device 144 may be configured to be rigid during one of the active and inactive portions of the articulation of the leg section 28B between the first and second angular positions. Furthermore, the lost motion device 144 may be configured to deflect during the other one of the active and inactive portions of the articulation of the leg section 28B between the first and second angular positions. More specifically, in the embodiment shown in the Figures, the biasing member

146 is rigid during the active portion of the articulation of the leg section 28B between the first and second angular positions. Furthermore, the biasing member 146 deflects during the inactive portion of the articulation of the leg section 28B between the first and second angular positions. However, the opposite may be true (i.e., the biasing member 146 may be rigid during the inactive portion and deflect during the active portion).

The lost motion device 144 may comprise a pair of elongated members 148 spaced from one another and each engaging the biasing member 146, as shown in FIGS. 20 and 21. One of the elongated members 148 may be coupled to the seat section 28A. The other one of the elongated members 148 may be coupled to the wheel system 130 (more specifically, to the at least one link 142 which is coupled to the deployment frame 132 of the wheel system 130).

The pair of elongated members 148 and the biasing member 146 may be axially aligned. The biasing member 146 may bias the pair of elongated members 148 away from one another. More specifically, the biasing member 146 may comprise a compression spring. The compression spring may be axially aligned with the pair of elongated members 148 to bias the pair of elongated members 148 away from one another. However, the compression spring may be configured to be aligned parallel to the pair of elongated members 148 or transverse to the elongated members 148. Likewise, the pair of elongated members 148 may be configured to be aligned parallel or transverse to one another. Furthermore, the lost motion mechanism maybe configured to utilize any suitable type of biasing member 146 (e.g., a torsion spring, an extension spring, a laminated spring, etc.).

The deflection of the biasing member 146 in the inactive portion of the articulation of the leg section 28B may allow the pair of elongated members 148 to move independent of one another rather than together as a unit when the biasing member 146 is rigid in the active portion of the articulation of the leg section 28B. More specifically, the elongated members 148 move toward one another as the biasing member 146 deflects. Because the elongated members 148 move independent of one another rather than together as a unit, the motion produced by articulation of the leg section 28B is taken-up by the biasing member 146 rather than being transmitted to the wheel system 130 for rotating the deployment frame 132 about the pivot axis P.

As shown in FIGS. 20 and 21, the lost motion mechanism may be realized as a component of the actuating arm 140. However, the actuating arm 140 may be utilized in the present disclosure separately from the lost motion mechanism.

Figure 22:
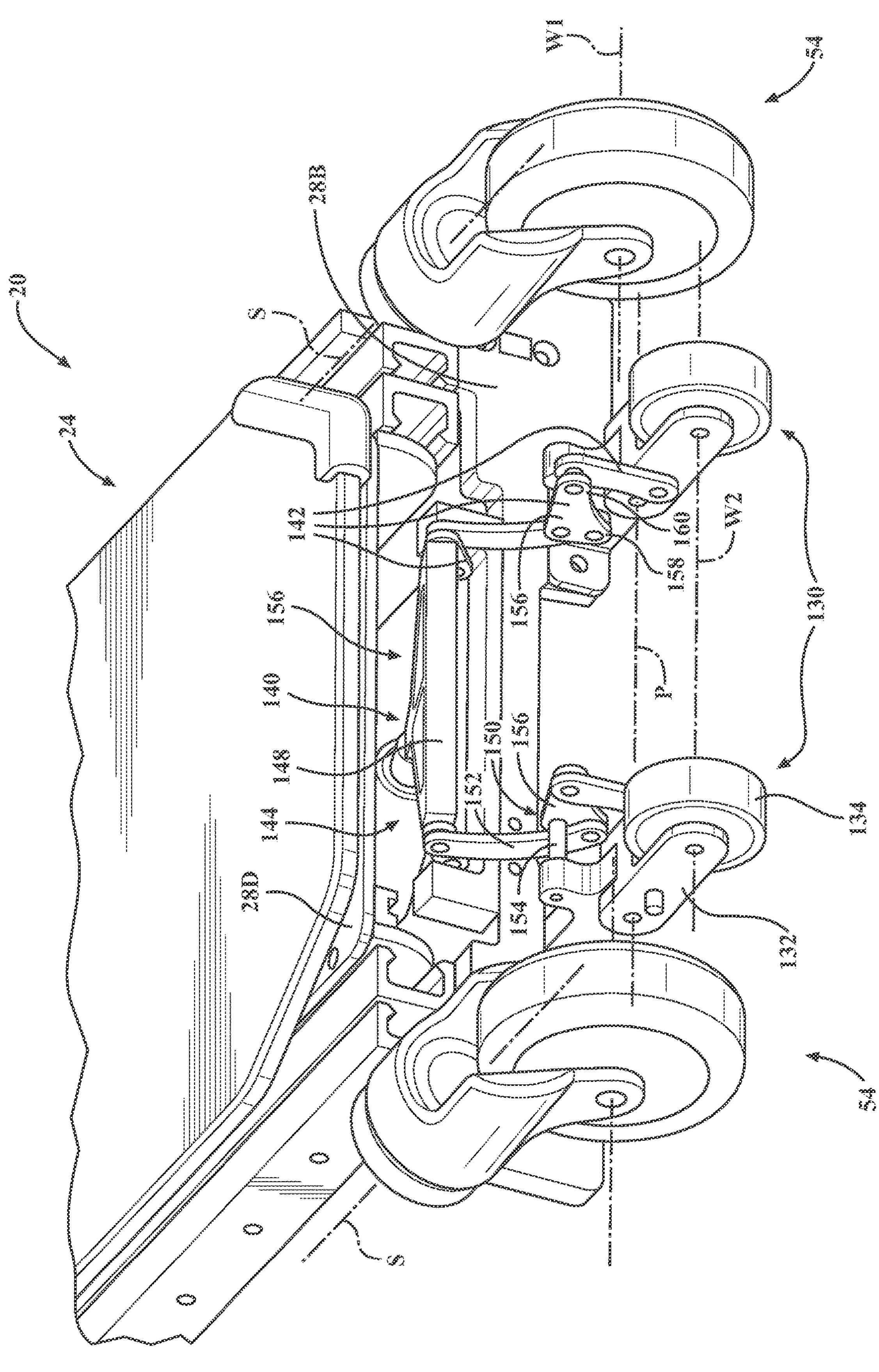
FIG. 22 is a perspective view of a portion of the patient support apparatus of FIG. 16, showing the wheel system.

As shown in FIGS. 22 and 23, the wheel deployment mechanism 136 may comprise a stop mechanism 150. The stop mechanism 150 may comprise a first member 152, and a second member 154 arranged to engage the first member 152 to inhibit rotation of the deployment frame 132 around the pivot axis P during the inactive portion of the articulation of the leg section 28B between the first and second angular positions. More specifically, the engagement of the first and second members 152, 154 that inhibits rotation of the deployment frame 132 occurs when the leg section 28B is in the intermediate position as the leg section 28B articulates between the first and second angular positions. The engagement of the first and second members 152, 154 prevents further movement of the wheel deployment mechanism 136. Further articulation of the leg section 28B applies load to the wheel deployment mechanism 136. The biasing member 146 of the lost motion mechanism is configured to deflect, which takes the motion from the further articulation of the leg section 28B after the first and second member 154 engage. As such, the biasing member 146 prevents damage to other components within the wheel deployment mechanism 136 and permits further movement of the leg section 28B in the inactive portion of the articulation. The engagement of the first and second members 152, 154 of the stop mechanism 150 may be designed to occur at any desired angular position between the first and second angular positions to define the active and inactive portions of the articulation according to desired design characteristics.

The stop mechanism 150 may be a component of the at least one link 142. As shown in FIGS. 22 and 23, the wheel deployment mechanism 136 (more specifically, the at least one link 142) may comprise a bell crank 156. The bell crank 156 may be rotatably coupled to the leg section 28B with the second member 154. More specifically, the second member 154 may configured as a shaft with the bell crank 156 rotatably coupled to the leg section 28B through the shaft.

The bell crank 156 may comprise a first arm 158 coupled to the first member 152 and a second arm 160 coupled to the deployment frame 132. The first member 152 may extend between and couple together the actuating arm 140 and the bell crank 156. The first member 152 may be arranged to rotate the bell crank 156 about the second member 154 to facilitate rotation of the deployment frame 132 around the pivot axis P.

The first and second members 152, 154 may be coupled to one side of the bell crank 156 to facilitate engagement of the first and second members 152, 154 during the inactive portion of the articulation of the leg section 28B between the first and second angular positions. The first member 152 rotates the bell crank 156 about the second member 154. In turn, the rotation of the bell crank 156 moves the first member 152 into contact with the second member 154. However, the stop mechanism 150 may have any suitable configuration to inhibit rotation of the deployment frame 132 around the pivot axis P during the inactive portion of the articulation of the leg section 28B between the first and second angular positions.

Accordingly, the wheel system 130 and the wheel deployment mechanism 136 provide the advantage of engaging the wheel 134 of the wheel system 130 (which is rotatable about the wheel axis W2 that is parallel to the seat axis A) with floor surface 38 while lifting steerable wheel assembly 54 off the floor surface 38 to facilitate efficient rotation of the wheel 134 about the wheel axis W2 and movement of the leg section 28B along the floor surface 38. Furthermore, the wheel deployment mechanism 136 automatically engages the wheel system 130 with the floor surface 38 when the support structure 28 articulates between the seated and supine configurations. This reduces the operational procedures required of an emergency responder to accommodate the litter 24 to the patient 22 and reduces the time that is required to articulate the support structure 28 between the seated and supine configurations, which is critical in emergency situations when time is of the essence. Furthermore, the wheel system 130 and the wheel deployment mechanism 136 also provide the advantage of requiring only one drive unit (i.e., a manually operated drive, electric motor, pneumatic pump, etc.) to simultaneously articulate the leg section 28B relative to the seat section 28A and engages the wheel system 130 with the floor surface 38, which reduces the weight of the litter 24 compared to multiple drive units that would otherwise be required to independently articulate the leg section 28B and engage the wheel system 130 with the floor surface 38.

Several configurations have been discussed in the foregoing description. However, the configurations discussed herein are not intended to be exhaustive or limit the invention to any particular form. The terminology that has been used is intended to be in the nature of words of description rather than of limitation. Many modifications and variations are possible in light of the above teachings and the invention may be practiced otherwise than as specifically described.

What is claimed is:

1. A patient support apparatus for supporting a patient, the patient support apparatus comprising:
- a litter comprising a support structure articulable between a seated configuration and a supine configuration, and configured to support the patient in each of the seated and supine configurations, with the support structure comprising:
  - a seat section;
  - a leg section coupled to the seat section and articulable relative to the seat section between a first angular position in the seated configuration and a second angular position, different from the first angular position, in the supine configuration;
  - a foot section coupled to the leg section and arranged for translation relative to the leg section along a linear path between a first position associated with the seated configuration and a second position, different from the first position, associated with the supine configuration;
  - a rail mounted to at least one of the leg and foot sections and longitudinally aligned with the translation of the foot section between the first and second positions and a roller bearing rotatably mounted to the other one of the leg and foot sections and in engagement with the rail, the roller bearing configured to roll along the rail and facilitate the translation of the foot section; and
- a litter actuation mechanism coupled to the litter and configured to move the support structure between the seated and supine configurations, with the litter actuation mechanism simultaneously articulating the leg section relative to the seat section and translating the foot section relative to the leg section along the linear path.

2. The patient support apparatus as set forth in claim 1, wherein the leg section is articulable relative to the seat section around a seat axis, with the translation of the foot section between the first and second positions orthogonal to the seat axis.

3. The patient support apparatus as set forth in claim 1, wherein the foot section is closer to the seat section in the first position than the second position.

4. The patient support apparatus as set forth in claim 1, wherein the foot section is disposed in the first position relative to the leg section when the leg section is disposed in the first angular position relative to the seat section and the foot section is disposed in the second position relative to the leg section when the leg section is disposed in the second angular position relative to the seat section.

5. The patient support apparatus as set forth in claim 1, wherein the leg section and the seat section are substantially coplanar when disposed in the second angular position.

6. The patient support apparatus as set forth in claim 1, further comprising a fowler section coupled to the seat section and articulable relative to the seat section, with the fowler section and the leg section coupled to opposing sides of the seat section.

7. The patient support apparatus as set forth in claim 1, wherein the litter actuation mechanism comprises an electrical device operably coupled to the leg section and configured to articulate the leg section between the first and second angular positions.

8. The patient support apparatus as set forth in claim 1, wherein the litter actuation mechanism comprises a gear assembly operably coupled to each of the leg section and the foot section, with the gear assembly having a gear ratio and configured to receive motion from the leg section as the leg section articulates between the first and second angular positions at a first rate and deliver motion to the foot section to translate the foot section between the first and second positions at a second rate, different than the first rate.

9. The patient support apparatus as set forth in claim 8, wherein the gear ratio is between 1:2 and 1:10.

10. The patient support apparatus as set forth in claim 8, wherein the leg section is articulable relative to the seat section around a seat axis; and
- wherein the gear assembly comprises a housing fixed to the seat section and an input shaft coupled to the leg section along the seat axis, with the leg section arranged to rotate the input shaft at the first rate during the articulation between the first and second angular positions.

11. The patient support apparatus as set forth in claim 10, wherein the gear assembly comprises an output shaft coupled to the foot section and a planetary gear set having the gear ratio and coupled to each of the input and output shafts and configured to transmit the motion between the input and output shafts.

12. The patient support apparatus as set forth in claim 11, wherein the litter actuation mechanism further comprises a gear rack coupled to the foot section and longitudinally aligned in a direction following the translation of the foot section between the first and second positions and a pinion gear coupled to the output shaft and meshed with the gear rack, with the pinion gear configured to receive motion from the output shaft and rotate and rotates in engagement with the gear rack to translate the foot section between the first and second positions.

13. The patient support apparatus as set forth in claim 12, further comprising a first pulley coupled to the output shaft, a second pulley coupled to the pinion gear, and a belt extending between and engaging each of the first and second pulleys to transmit motion between the first and second pulleys.

14. The patient support apparatus as set forth in claim 1, further comprising a base selectively coupled to and supporting the litter, the base comprising a base lift device configured to raise and lower the litter relative to a floor surface when the litter is coupled to the base.

15. The patient support apparatus as set forth in claim 1, wherein the leg section is articulable relative to the seat section around a seat axis; and
- further comprising a steerable wheel assembly coupled to the leg section and configured to engage a floor surface in each of the seated and supine configurations, with the steerable wheel assembly comprising a caster frame coupled to the leg section and rotatable relative to the leg section around a steering axis transverse to the seat axis to facilitate turning the litter.

16. The patient support apparatus as set forth in claim 15, further comprising a wheel coupled to the caster frame and rotatable relative to the caster frame around a wheel axis to facilitate movement of the litter along the floor surface, with the caster frame disposed in a transition position when the wheel axis and the seat axis are parallel.

17. The patient support apparatus as set forth in claim 16, wherein the steering axis of the caster frame and the wheel axis of the wheel are offset, with the wheel axis arranged to be disposed below the steering axis in the supine configuration when the caster frame is disposed in the transition position for preventing contact between the foot section and the floor surface.

18. A patient support apparatus for supporting a patient, the patient support apparatus comprising:

a litter comprising a support structure articulable between a seated configuration and a supine configuration, and configured to support the patient in each of the seated and supine configurations, with the support structure comprising:

a seat section;

a leg section coupled to the seat section and articulable relative to the seat section between a first angular position in the seated configuration and a second angular position, different from the first angular position, in the supine configuration; and a foot section coupled to the leg section and arranged for translation relative to the leg section along a linear path between a first position associated with the seated configuration and a second position, different from the first position, associated with the supine configuration; and a litter actuation mechanism coupled to the litter and configured to move the support structure between the seated and supine configurations, with the litter actuation mechanism simultaneously articulating the leg section relative to the seat section and translating the foot section relative to the leg section along the linear path, wherein the litter actuation mechanism comprises a gear assembly operably coupled to each of the leg section and the foot section, with the gear assembly having a gear ratio and configured to receive motion from the leg section as the leg section articulates between the first and second angular positions at a first rate and deliver motion to the foot section to translate the foot section.

19. A patient support apparatus for supporting a patient, the patient support apparatus comprising:

a litter comprising a support structure articulable between a seated configuration and a supine configuration, and configured to support the patient in each of the seated and supine configurations, with the support structure comprising:

a seat section; and a leg section coupled to the seat section and articulable relative to the seat section around a seat axis between a first angular position in the seated configuration and a second angular position, different from the first angular position, in the supine configuration;

a steerable wheel assembly coupled to the leg section and configured to engage a floor surface in each of the seated and supine configurations, with the steerable wheel assembly comprising:

a caster frame coupled to the leg section and rotatable relative to the leg section around a steering axis transverse to the seat axis to facilitate turning the litter; and a wheel coupled to the caster frame and rotatable relative to the caster frame around a wheel axis to facilitate movement of the litter along the floor surface, with the caster frame disposed in a transition position when the wheel axis and the seat axis are parallel; and a wheel orientation mechanism operably coupled to each of the leg section and the steerable wheel assembly, with the wheel orientation mechanism configured to rotate the caster frame around the steering axis to the transition position when the leg section articulates between the first and second angular positions for maintaining rotation of the wheel around the wheel axis along the floor surface as the support structure articulates between the seated and supine configurations.

* * * * *